United States Patent
Shiohara

(10) Patent No.: US 8,355,070 B2
(45) Date of Patent: Jan. 15, 2013

(54) DEVELOPMENT PROCESSING DEVICE, DEVELOPMENT PROCESSING METHOD, AND STORAGE MEDIUM OF COMPUTER PROGRAM FOR DEVELOPMENT PROCESS FOR DEVELOPING UNDEVELOPED IMAGE DATA

(75) Inventor: Ryuichi Shiohara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 327 days.

(21) Appl. No.: 12/471,329

(22) Filed: May 22, 2009

(65) Prior Publication Data

US 2009/0290042 A1 Nov. 26, 2009

(30) Foreign Application Priority Data

May 23, 2008 (JP) ................. 2008-135946
May 23, 2008 (JP) ................. 2008-135952
May 23, 2008 (JP) ................. 2008-135954

(51) Int. Cl.
*H04N 5/222* (2006.01)
*H04N 5/235* (2006.01)
*H04N 9/64* (2006.01)
*H04N 5/14* (2006.01)
*H04N 1/46* (2006.01)
*H04N 5/93* (2006.01)
*G06F 17/00* (2006.01)

(52) U.S. Cl. ................ 348/333.12; 348/229.1; 348/576; 258/537; 286/282; 715/255

(58) Field of Classification Search ............... 348/207.1, 348/222.1, 223.1, 229.1, 230.1, 333.01, 333.11, 348/333.02, 333.12, 576, 577; 358/537, 358/527, 452; 715/723; 345/597; 386/282
See application file for complete search history.

(56) References Cited

U.S. PATENT DOCUMENTS 6,980,233 B1 * 12/2005 Hirasawa .................. 348/207.1
7,010,176 B2 * 3/2006 Kusunoki ..................... 382/299
(Continued)

FOREIGN PATENT DOCUMENTS

GB 2307383 A 5/1997
(Continued)

OTHER PUBLICATIONS

Hayakawa, Hiroyuki and Ryoji Kimura; *Hiroyuki Hayakawa's Professional Lecture for Adobe Photoshop Lightroom*; Jul. 10, 2007; First Edition, First Issue; Mainichi Coummunications; Tokyo, Japan.

*Primary Examiner* — John Villecco
(74) *Attorney, Agent, or Firm* — Kilpatrick Townsend & Stockton LLP

(57) ABSTRACT

There is provided a development processing device that develops undeveloped image data. The development processing device includes a change screen displaying unit displays a first number line corresponding to a first initial parameter, a second number line corresponding to a second initial parameter, a reference line that intersects the first number line in a position corresponding to the first initial parameter and intersects the second number line in a position corresponding to the second initial parameter, a first marker that represents a position corresponding to the first user parameter on the first number line, and a second marker that represents a position corresponding to the second user parameter on the second number line on the parameter changing screen, and the development processing unit performs the development process based on at least the first user parameter and the second user parameter.

17 Claims, 21 Drawing Sheets

U.S. PATENT DOCUMENTS

| | | |
|---|---|---|
| 7,324,749 B2 | 1/2008 | Kubo |
| 7,623,722 B2 * | 11/2009 | Prentice et al. ............... 382/254 |
| 7,834,924 B2 * | 11/2010 | Uehara et al. ............ 348/333.02 |
| 7,920,739 B2 * | 4/2011 | Chien et al. ................... 382/162 |
| 2003/0184650 A1 * | 10/2003 | Brown et al. .............. 348/207.1 |
| 2005/0163391 A1 | 7/2005 | Ishida |
| 2005/0174449 A1 * | 8/2005 | Matsuzaka |
| 2005/0174590 A1 * | 8/2005 | Kubo ............................ 358/1.9 |
| 2005/0212914 A1 * | 9/2005 | Seto et al. .................. 348/207.1 |
| 2005/0219580 A1 | 10/2005 | Ozawa |
| 2008/0218605 A1 * | 9/2008 | Matsuzaka ................ 348/240.3 |
| 2008/0226199 A1 * | 9/2008 | Breglio ........................ 382/311 |
| 2010/0066861 A1 | 3/2010 | Sakagami |

FOREIGN PATENT DOCUMENTS

| | | |
|---|---|---|
| JP | 09-198224 A | 7/1997 |
| JP | 10-301745 A | 11/1998 |
| JP | 2001-061075 A | 3/2001 |
| JP | 2004-040559 A | 2/2004 |
| JP | 2005-202749 A | 7/2005 |
| JP | 2005-208886 A | 8/2005 |
| JP | 2005-242503 A | 9/2005 |
| JP | 2005-275977 A | 10/2005 |
| JP | 2005-284411 A | 10/2005 |
| JP | 2005-316332 A | 11/2005 |
| JP | 2006-340120 A | 12/2006 |
| JP | 2007-124599 A | 5/2007 |

* cited by examiner

FIG. 9A
FILTER ARRANGEMENT

| G | R | G | R | G | R |
|---|---|---|---|---|---|
| B | G | B | G | B | G |
| G | R | G | R | G | R |
| B | G | B | G | B | G |
| G | R | G | R | G | R |
| B | G | B | G | B | G |

FIG. 9B
USED PIXEL

| G | R |   |   | G | R |
|---|---|---|---|---|---|
| B |   |   |   | B |   |
|   |   |   |   |   |   |
|   |   |   |   |   |   |
| G | R |   |   | G | R |
| B |   |   |   | B |   |

FIG. 9C
RGB PIXEL

| RGB | RGB |
|-----|-----|
| RGB | RGB |

FIG. 10A
3024 × 2016 PIXELS
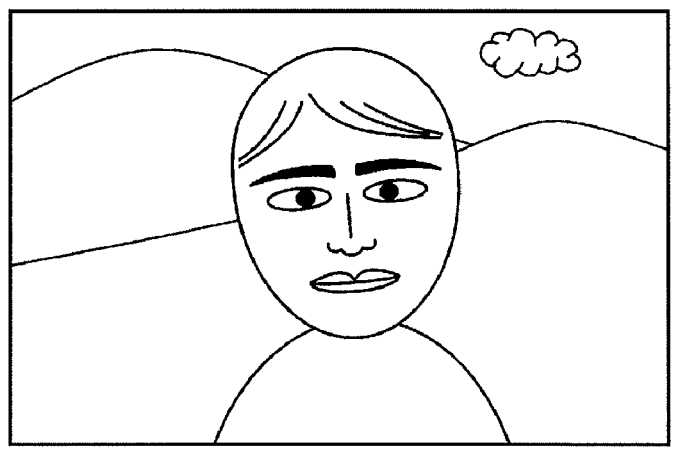
FIG. 10B
756 × 504 PIXELS
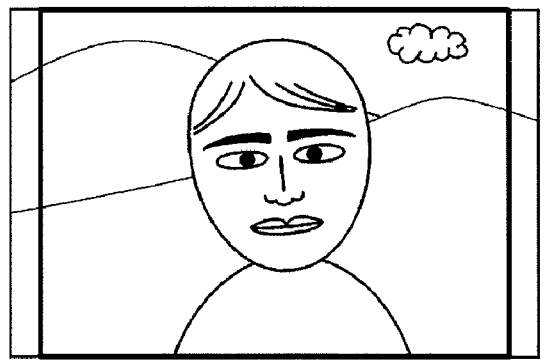
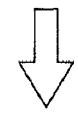
FIG. 10C
320 × 240 PIXELS
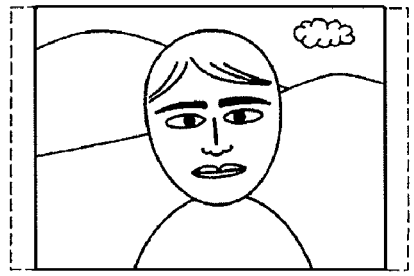

DEVELOPMENT PROCESSING DEVICE, DEVELOPMENT PROCESSING METHOD, AND STORAGE MEDIUM OF COMPUTER PROGRAM FOR DEVELOPMENT PROCESS FOR DEVELOPING UNDEVELOPED IMAGE DATA

BACKGROUND

1. Technical Field

The present invention relates to technology for developing image data.

2. Related Art

Recently, in digital still cameras, raw image data is recorded in a memory card. This raw image data cannot be handled by a general image processing device. For example, for raw image data that is used commonly, only data of one color exists in one pixel. Thus, the raw image data cannot be directly handled by a general image processing device that requires data of three colors for one pixel. Accordingly, the raw image data recorded in the memory card is converted into image data of a JPEG format, a TIFF format, or the like that is commonly used, image data for print (image data for which development is completed), or the like by using a development processing application of a personal computer or the like.

In the process (referred to as a "development process"; At this moment, the raw image data is data before the development process is performed, and thus, the data is also referred to as "undeveloped image data.") for converting the raw image data into image data of a format that is commonly used, the image quality of generated image data for which development is completed is changed markedly in accordance with process parameters (development parameters) at the time of performing the development process. Thus, generally, the development processing application or the like has a parameter adjusting function, so that a user can adjust these parameters.

This development process has been also disclosed in JP-A-2005-202749 and JP-A-2007-124599.

However, usually, a user interface that is used when a user changes the development parameters is created for persons who are acquainted with the development process. Thus, for an ordinary user, easiness of adjustment of the development parameters is not sufficient all the time. For example, when the result of change of the development parameters is not desirable or when the development parameters are changed mistakenly, it is difficult for an ordinary user to return the development parameters to their states before the change.

SUMMARY

An advantage of some aspects of the invention is that it provides technology for improving easiness of adjustment of the development parameters.

The invention may be implemented in the following forms or applied examples.

APPLIED EXAMPLE 1

According to Applied Example 1, there is provided a development processing device that develops undeveloped image data. The development processing device includes: a development processing unit that generates image data of a predetermined format for which development is completed from the undeveloped image data by performing a development process for the undeveloped image data; a parameter determining unit that determines at least two initial parameters of a first initial parameter and a second initial parameter that are used for the development process; a change screen displaying unit that displays a parameter changing screen on a display screen; and an acceptance unit that accepts designation of a first user parameter corresponding to the first initial parameter and a second user parameter corresponding to the second initial parameter from a user. The change screen displaying unit displays a first number line corresponding to the first initial parameter, a second number line corresponding to the second initial parameter, a reference line that intersects the first number line in a position corresponding to the first initial parameter and intersects the second number line in a position corresponding to the second initial parameter, a first marker that represents a position corresponding to the first user parameter on the first number line, and a second marker that represents a position corresponding to the second user parameter on the second number line on the parameter changing screen, and the development processing unit performs the development process based on at least the first user parameter and the second user parameter.

According to the above-described development processing device, the position of the number line corresponding to the initial parameter is disposed on the reference line. Accordingly, the user can intuitively perceive the existence of a parameter that is deviated from the reference line, and thus, the user can easily recognize that the parameter has been changed by him.

APPLIED EXAMPLE 2

In the above-described development processing device, each of the number lines has a length corresponding to a settable range of the corresponding parameter, and the change screen displaying unit allows the number line and the reference line to intersect each other in a position of a determined initial parameter by moving the number line corresponding to the determined initial parameter after the parameter determining unit determines the initial parameter. According to this Applied Example 2, the lengths of the number lines correspond to changeable ranges of the parameters. Accordingly, the user can set each parameter to any arbitrary value within the range in which each parameter can be changed.

APPLIED EXAMPLE 3

In the above-described development processing device, a zero position of the first number line intersects the reference line, and the first user parameter represents an amount of change from the first initial parameter. According to this applied example, the user can intuitively acquire a difference between the initial parameter that is determined by the development parameter determining unit and the user parameter.

APPLIED EXAMPLE 4

In the above-described development processing device, the parameter determining unit determines the initial parameter by analyzing the undeveloped image data. According to this applied example, the initial parameter can be set to a value according to an image to be developed.

APPLIED EXAMPLE 5

In the above-described development processing device, the acceptance unit does not accept the designation of the user during a period in which the parameter determining unit performs a process for determining the initial parameter.

APPLIED EXAMPLE 6

The above-described development processing device further includes an undeveloped image data designating unit that accepts designation of the undeveloped image data. The parameter determining unit automatically determines the initial parameter after accepting the designation of the undeveloped image data, and the acceptance unit does not accept the designation of the user at least until the parameter determining unit determines the initial parameter after the undeveloped image data designating unit accepts the designation of the undeveloped image data. According to this applied example, the user can adjust the user parameter more assuredly by referring to the initial parameter according to the image to be developed.

APPLIED EXAMPLE 7

In the above-described development processing device, the change screen displaying unit additionally displays a first initial marker that represents a position corresponding to the first initial parameter on the first number line and a second initial marker that represents a position corresponding to the second initial parameter on the second number line. According to this applied example, the user can acquire a difference between the initial parameter and the user parameter more easily.

APPLIED EXAMPLE 8

In the above-described development processing device, the change screen displaying unit changes a display form of at least one between the corresponding marker and the corresponding initial marker based on relationship between the initial parameter and the user parameter. According to this applied example, the user can acquire a difference between the initial parameter and the user parameter more easily.

In addition, the invention may be embodied in various forms. For example, the invention may be embodied in forms of a development processing device and a development processing method, an image outputting device and an image outputting method by using the development processing device or the development processing method, a computer program for implementing the methods or the function of the devices, a recording medium having the computer program recorded thereon, a data signal implemented in a carrier wave including the computer program, or the like.

BRIEF DESCRIPTION OF THE DRAWINGS

The invention will be described with reference to the accompanying drawings, wherein like numbers reference like elements.

FIGS. 9A, 9B and 9C are explanatory diagrams showing the appearance of performing a simple de-mosaic process for the raw image.

FIGS. 10A, 10B, and 10C are explanatory diagrams showing the appearance of generating an image of a QVGA size from a raw image.

DESCRIPTION OF EXEMPLARY EMBODIMENTS

Hereinafter, an embodiment of the invention will be described in the following order based on examples.
A. Embodiment
  A1. Configuration of Photo Viewer
  A2. Start of Development Process
  A3. Generation of Raw Image
  A4. Automatic Adjustment of Development Parameters
  A5. Development Process for Display
  A6. Display of Preview Screen
  A7. Main Development Process
B. Modified Example of Preview Screen
C. Modified Examples

A. EMBODIMENT

A1. Configuration of Photo Viewer

Figure 1:
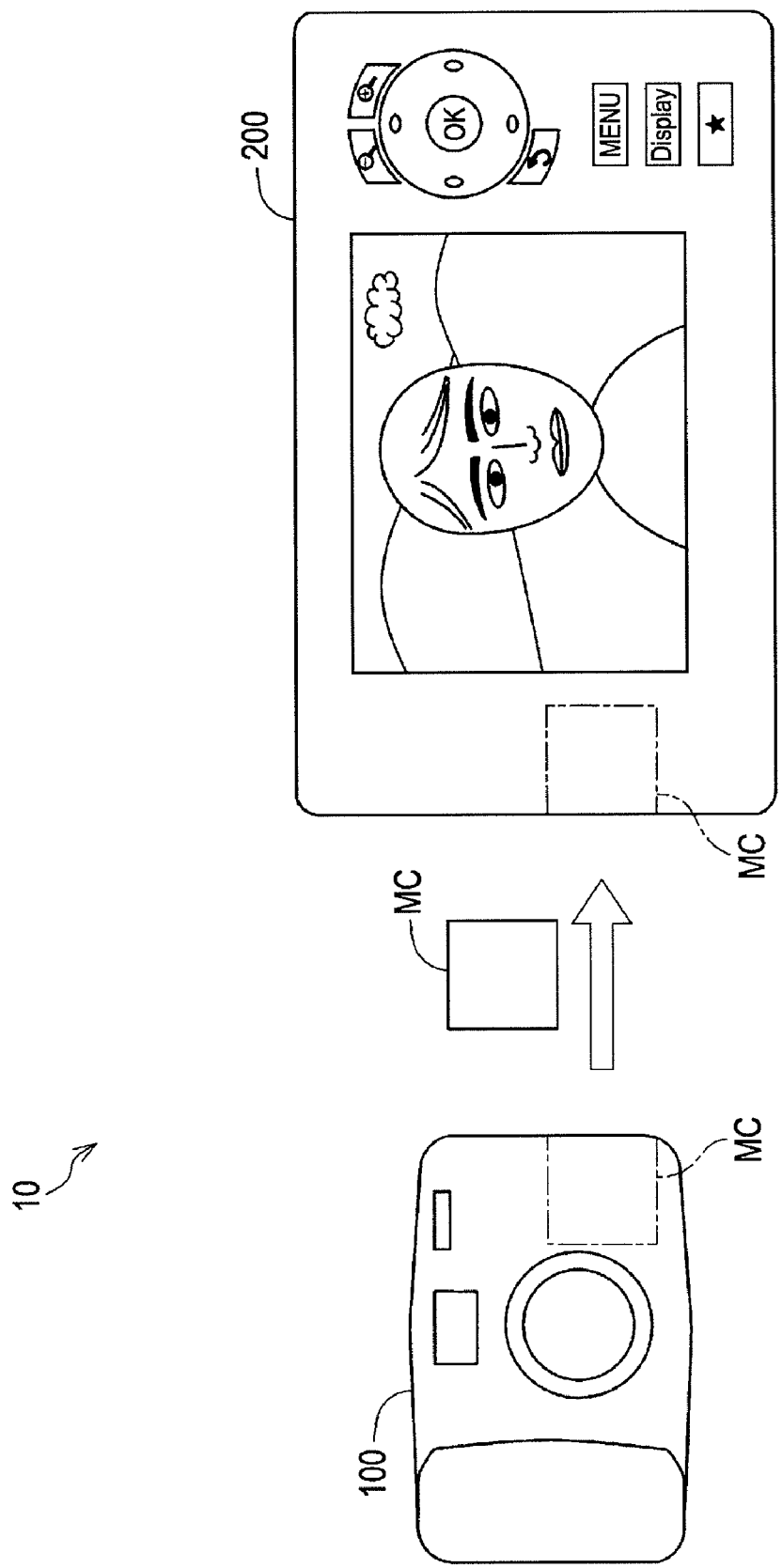
FIG. 1 is a schematic configuration diagram schematically showing the configuration of an image displaying system according to an embodiment of the invention.

FIG. 1 is a schematic configuration diagram schematically showing the configuration of an image data generating system 10 according to an embodiment of the invention. The image data generating system 10 includes a digital still camera 100 and a photo viewer 200. The digital still camera 100 and the photo viewer 200 include a memory card slot in which a memory card MC denoted by a dashed-dotted line is loaded, respectively.

The digital still camera 100 generates an image file of a predetermined format based on a photographed image. The generated image file is stored in the memory card MC. The image that is photographed by the digital still camera 100 can be checked in the photo viewer 200 by inserting the memory card MC, in which the image file is stored, into the photo viewer 200.

Figure 2:
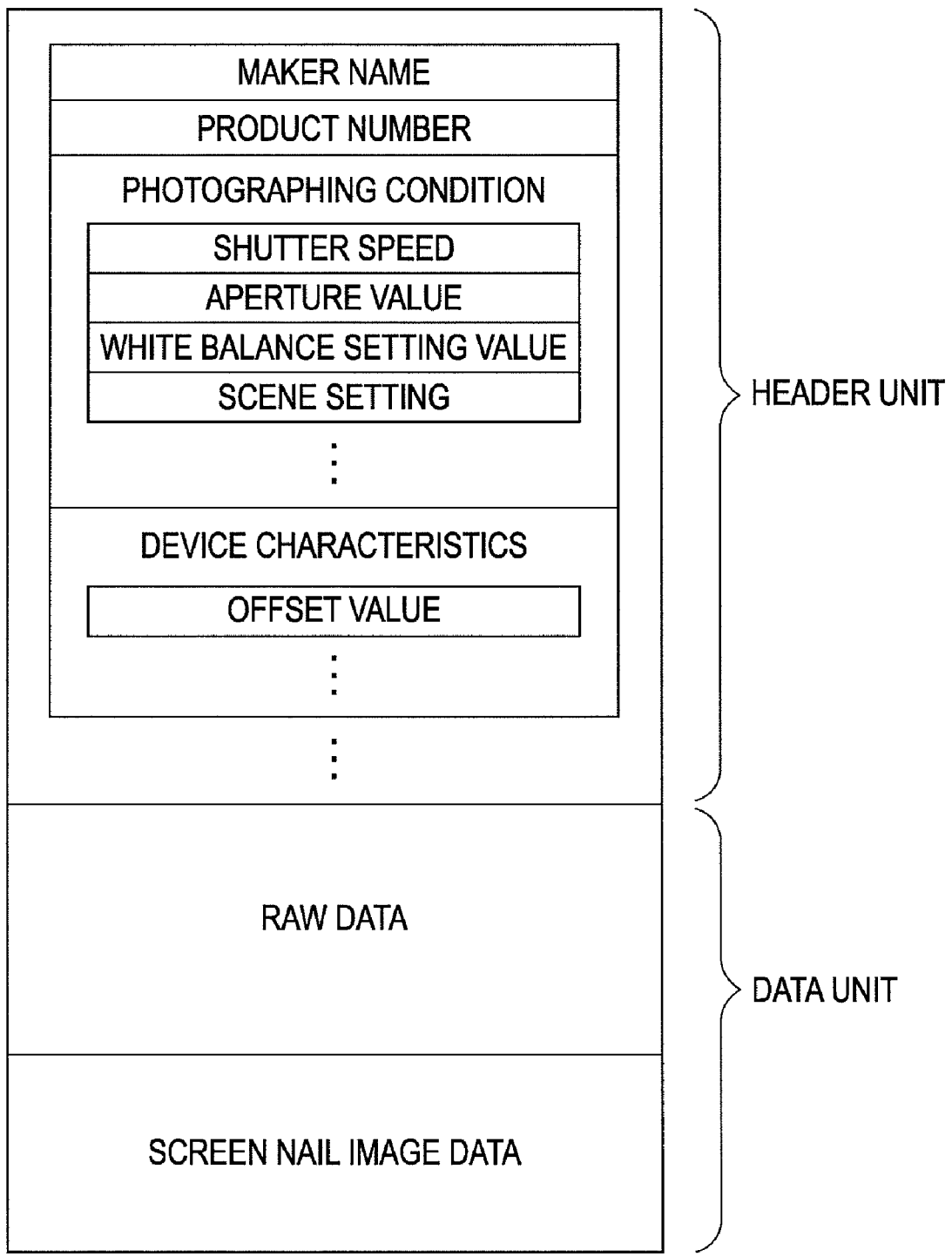
FIG. 2 is an explanatory diagram showing the data format of a raw image file that is generated by a digital still camera.

FIG. 2 is an explanatory diagram showing one example of the data format of the image file that is generated by the digital still camera 100 and is stored in the memory card MC. The image file shown in FIG. 2 is an image file of a format referred to as a raw image file. In the image file, raw data that represents an output value of an image pickup element (a CCD, a CMOS, or the like) that is included in the digital still camera 100 is stored. This raw image file is generated in a data format that is similar to an Exif (Exchangeable Image File Format). As shown in the figure, the raw image file includes a header portion and a data portion.

In the header portion, additional information such as a maker name, a product number, a photographing condition, device characteristics of a camera that generates the raw image file is described. In addition, in the photographing condition, setting conditions at the time of photographing such as a shutter speed, an aperture value, a white balance setting value, and a scene setting are included. In addition, in the device characteristics, various parameters that represent the device characteristic of the digital still camera 100 such as an offset value (to be described later) for a gray scale value are included.

In the data portion, raw data that is generated at the time of photographing and screen nail image data are included. The screen nail image data is image data (image data for which development process is completed) in which a development process (image generating process) is performed for the raw data. The raw data and the screen nail image data are recorded simultaneously with a photographing operation and are data that represents a same subject (photographed image). The screen nail image data, for example, is used when an image, for which a photographing operation is completed, is displayed in a display panel disposed in the camera in a simple manner. In addition, the screen nail image data is image data of a JPEG format for which a development process is performed in the camera.

The data formats of the raw image file, the raw data, and the screen nail image data differ in accordance with the maker and the model of the digital still camera 100 (FIG. 1). The vertical and horizontal numbers of pixels of the screen nail image data, for example, are set to be equal to numbers of pixels of the raw data, numbers of pixels that are smaller than those of the raw data by reducing the raw data for display, or approximate numbers of pixels of VGA (640×480 pixels).

Figure 3:
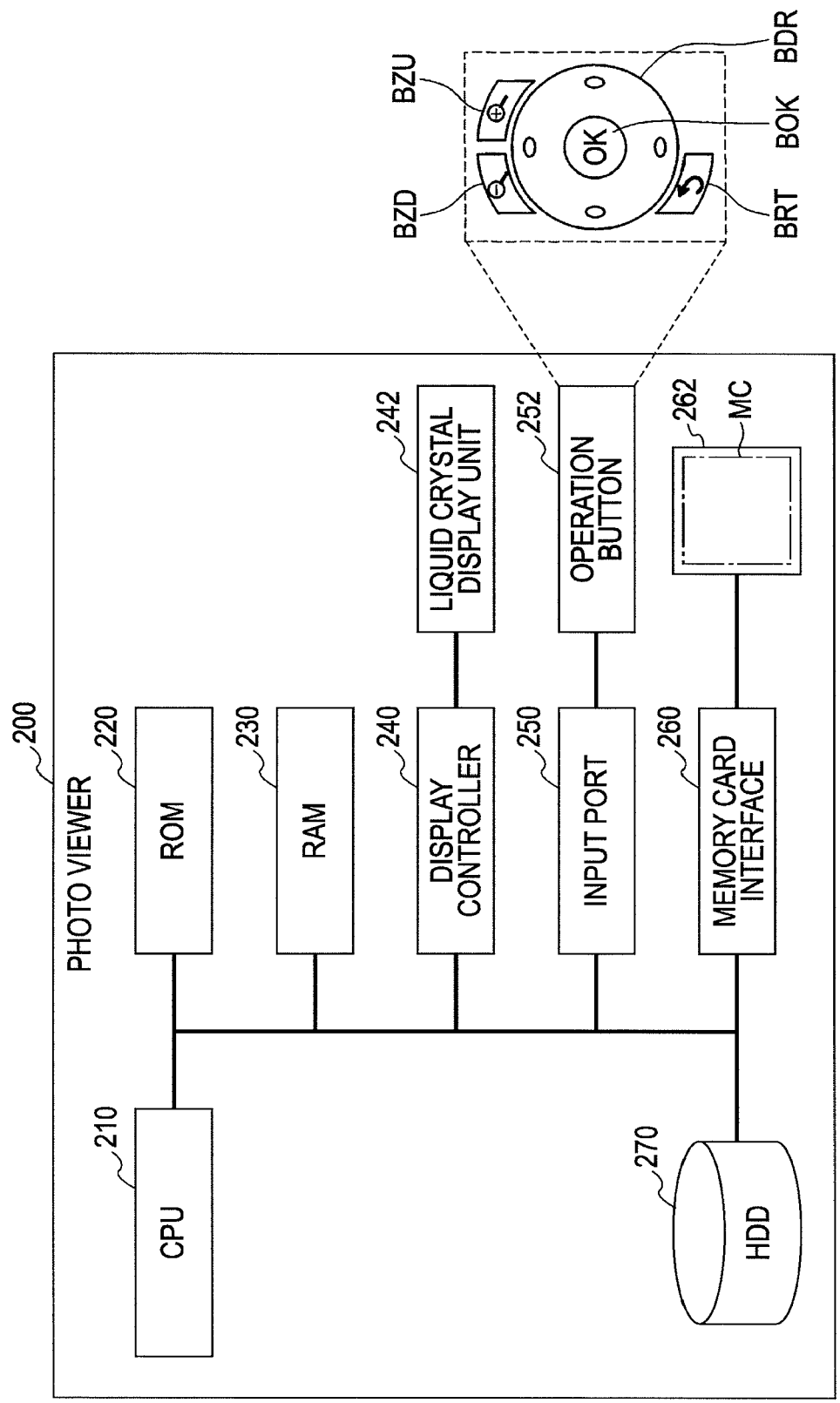
FIG. 3 is a schematic configuration diagram schematically showing the configuration of a photo viewer.

FIG. 3 is a schematic configuration diagram schematically showing the configuration of the photo viewer 200. The photo viewer 200 includes a CPU 210, a ROM 220, a RAM 230, a display controller 240, an input port 250, a memory card interface 260, and a hard disk drive (HDD) 270. In addition, the photo viewer 200 includes an external device interface (not shown) that is used for being connected to a personal computer or a printer. However, connection to the external device is not directly related to the invention, and thus, a description thereof is omitted here.

To the display controller 240, a liquid crystal display device 242 is connected. The display controller 240 displays various images in the liquid crystal display device 242 by controlling the liquid crystal display device 242 based on the image data that is supplied from the CPU 210. In addition, the display controller 240 according to this embodiment accepts image data of a YUV format (ITU-R BT.601, ITU-R BT.656, or the like) that is standardized by the ITU-R (Wireless Communication Department of International Telecommunication Union).

To the input port 250, operation buttons 252 disposed in the photo viewer 200 are connected. The input port 250 supplies various states of button operations, which are included in the operation buttons 252, to the CPU 210. Accordingly, the CPU 210 can acquire various directions given by a user. The operation buttons 252, for example, include a reduction button BZD, an enlargement button BZU, a direction button BDR, an OK button BOK, and a cancel button BRT that is used for cancelling a previous operation.

To the memory card interface 260, the memory card slot 262 is connected. The memory card interface 260 is an interface that is used for intermediating data transmission and data reception between the memory card MC inserted into the memory card slot 262 and the CPU 210.

The CPU 210 implements various functions included in the photo viewer 200 by controlling the units 220, 230, 240, 250, 260, and 270 included in the photo viewer 200 by executing programs that are stored in the ROM 220, the RAM 230, and the HDD 270. In the RAM 230 and the HDD 270, temporary data generated at a time when the CPU 210 executes a program is stored. In the HDD 270, image data read out from the memory card MC is stored, in addition to the programs and the temporary data.

A2. Start of Development Process

Figure 4:
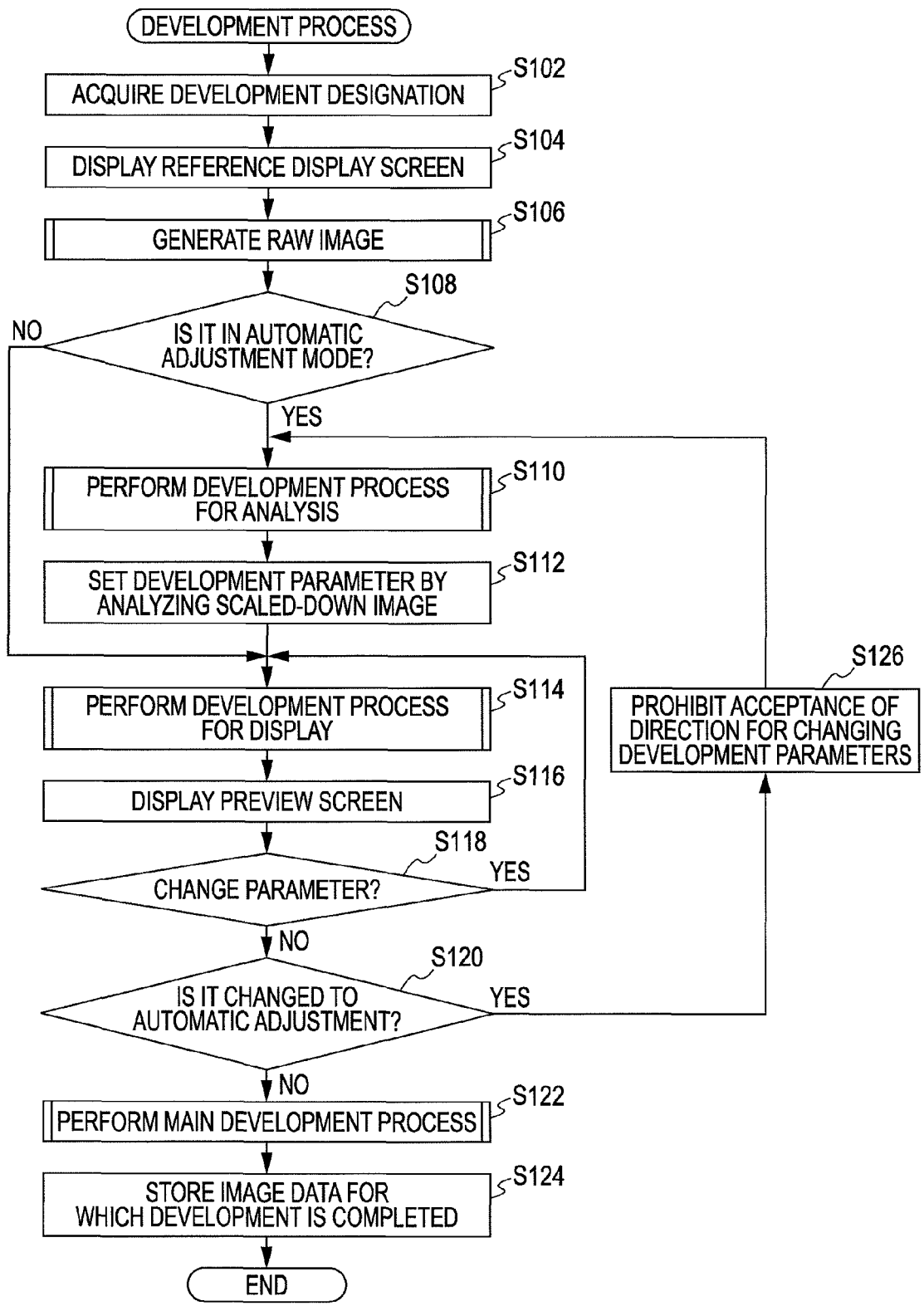
FIG. 4 is a flowchart showing the flow of a development process.

FIG. 4 is a flowchart showing the flow of a development process that is performed by the CPU 210. The development process shown in FIG. 4 is performed for a case where a direction for performing the development process is given to the photo viewer 200 from a user. The CPU 210 performs this development process, and whereby a function of the photo viewer 200 as a development processing device is implemented.

In Step S102, the CPU 210 acquires a direction (designation of development) for designating the development content that is given by the user. As the development content, a raw image file in which the raw data to be developed is stored and an adjustment mode of parameters (development parameters) for the development process are designated. In particular, the CPU 210 displays a menu screen in the liquid crystal display device 242 by generating a menu screen for acquiring the designation and supplying the generated menu screen to the display controller 240. Then, the CPU 210 acquires the designation of development by acquiring the operation state of the operation buttons 252 though the input port 250.

Figure 5A:
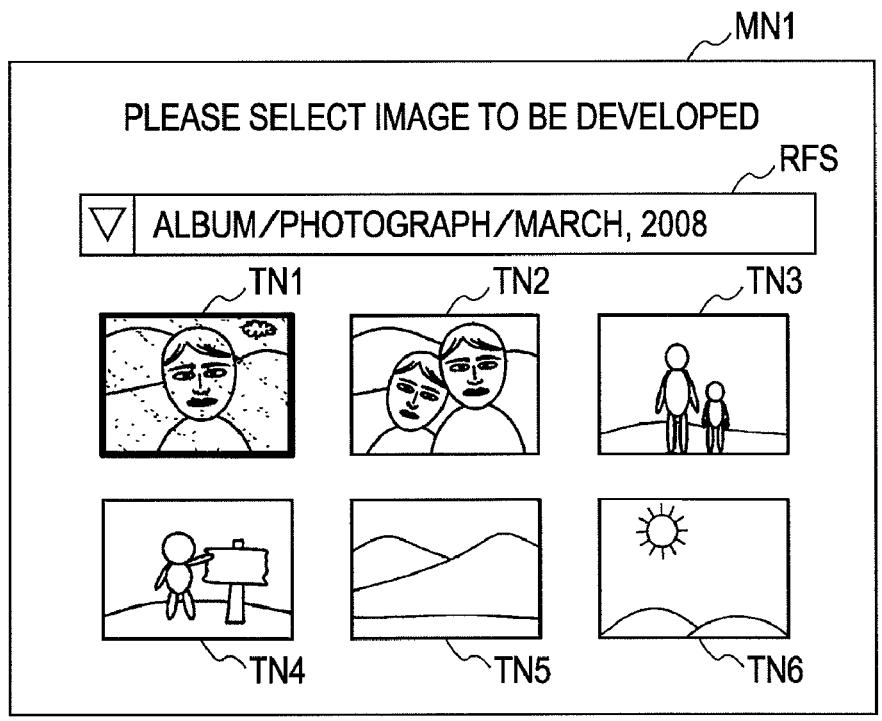
FIGS. 5A and 5B are explanatory diagrams showing an example of menu screens that is displayed in a liquid crystal display device in Step S102.
Figure 5B:
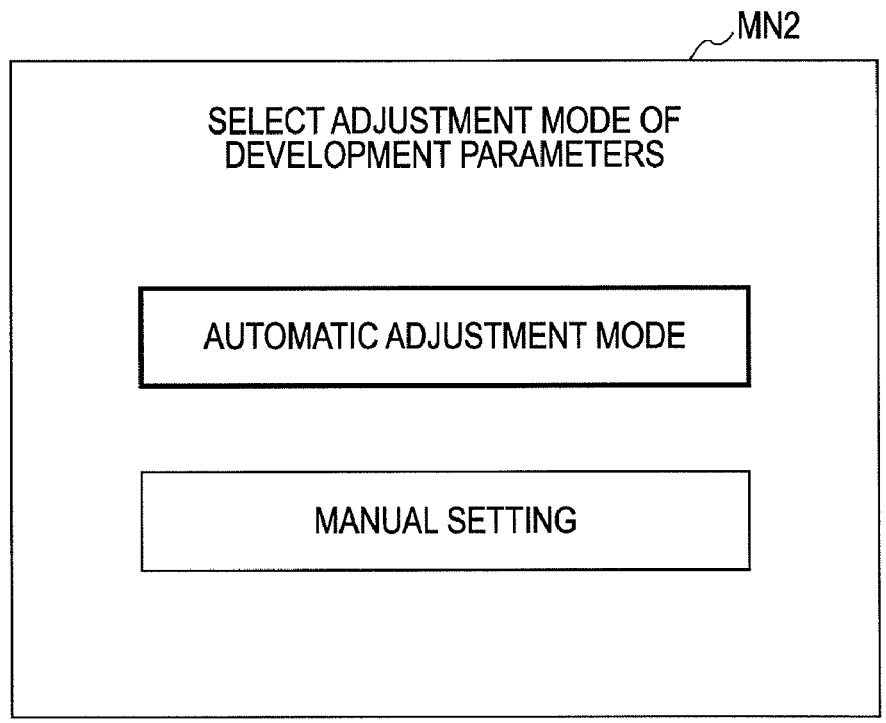

FIGS. 5A and 5B are explanatory diagrams showing an example of menu screens that are displayed in the liquid crystal display device 242 in Step S102. FIG. 5A shows a menu screen MN1 for acquiring designation of a raw image file. In addition, FIG. 5B is a menu screen MN2 for acquiring designation of an adjustment mode of the development parameters.

As shown in FIG. 5A, in the menu screen MN1, a folder selecting area RFS that is used for selecting a folder in which the raw image file is stored and six thumb nails TN1 to TN6 are included. In the example shown in FIG. 5A, a folder named as "ALBUM/PHOTO/MARCH 2008" is selected in the folder selecting area RFS. In addition, one thumb nail TN1 is selected from among the thumb nails TN1 to TN6 of the raw image files that are stored in the selected folder.

In the state shown in FIG. 5A, when a user operates the OK button BOK (FIG. 3), a raw image file corresponding to the thumb nail TN1 is designated as the raw image file to be developed. On the other hand, when the cancel button BRT is operated in the state shown in FIG. 5A, the development process is stopped, and a menu screen (not shown) for selecting the process content is displayed in the liquid crystal display device 242.

When the OK button BOK is operated in the state shown in FIG. 5A, as a next step, the menu screen MN2 for acquiring designation of the adjustment mode shown in FIG. 5B is displayed. In this menu screen MN2, two adjustment modes including an "automatic adjustment mode" and a "manual adjustment mode" are represented. When the user operates the OK button BOK in a state in which the "automatic adjustment mode" is selected as shown in FIG. 5B, the automatic adjustment mode is designated as the adjustment mode of the parameters. On the other hand, when the user presses the upper or lower portion of the direction button BDR (FIG. 3), the selection state of the adjustment mode is changed. In addition, when the user operates the cancel button BRT, the menu screen MN1 for acquiring designation of the raw image file is returned.

In Step S104 shown in FIG. 4, the CPU 210 displays a reference display screen. In particular, the CPU 210 reads out screen nail image data from the raw image file corresponding to the selected thumb nail TN1 (FIG. 5A). Then, the CPU 210 displays the reference display screen that includes an image (screen nail image) represented by the screen nail image data in the liquid crystal display device 242.

Figure 6:
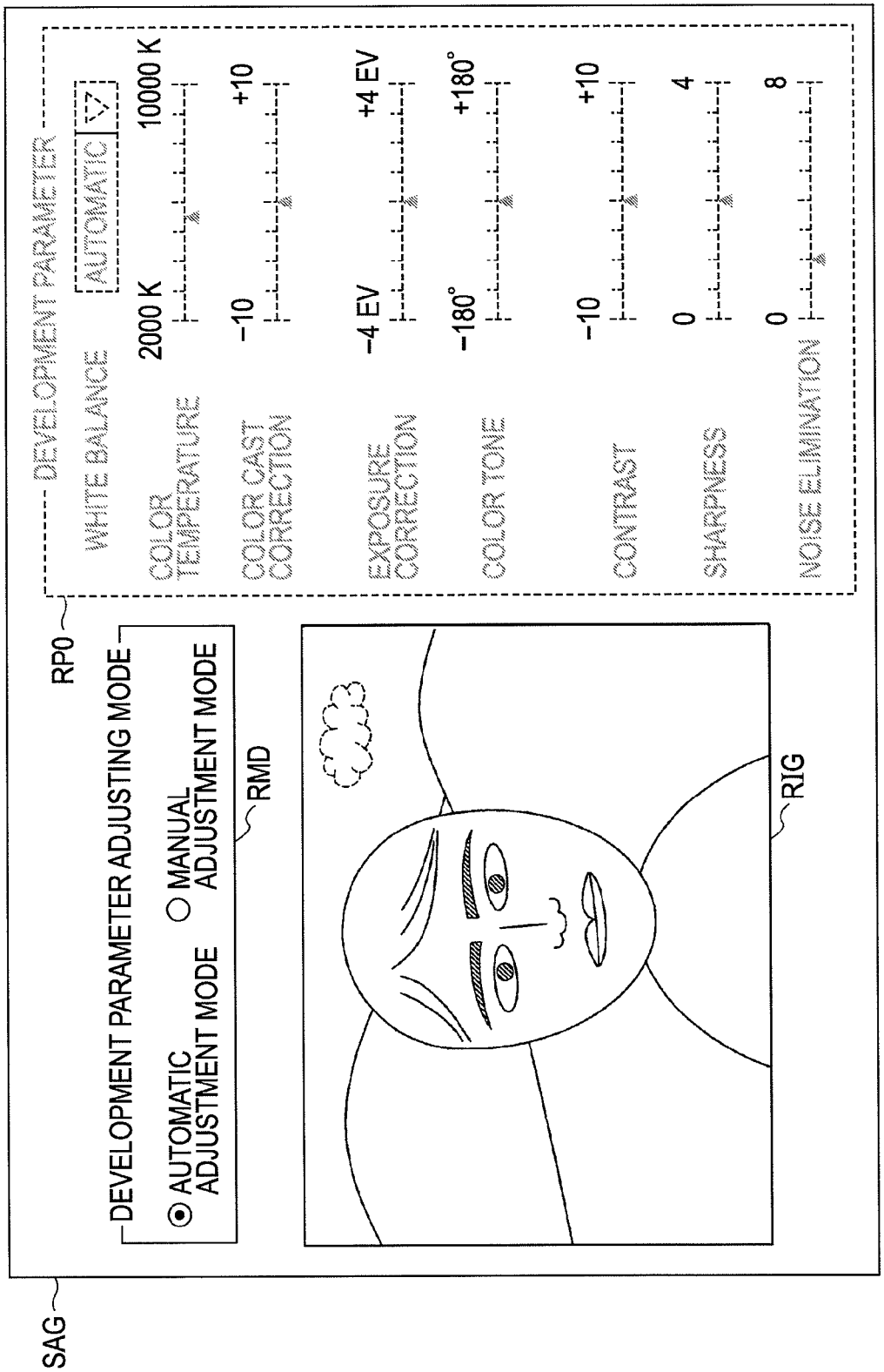
FIG. 6 is an explanatory diagram showing an example of a reference display screen.

FIG. 6 is an explanatory diagram showing an example of the reference display screen. In the reference display screen SAG, a reference image displaying area RIG in which the screen nail image is temporarily displayed for reference, an adjustment mode setting area RMD, and a development parameter setting area RP0 are disposed.

As shown in FIG. 6, in the development parameter setting area RP0, slide bars are disposed for "color temperature" and "color cast correction" that represent a white balance setting value, "exposure" that represents an exposure correcting coefficient, "tone" that represents the amount of color correction, "contrast" that represents an adjustment value of contrast, "sharpness" that represents an adjustment value of sharpness, and "noise removal" that represents the degree of noise removal. In each slide bar, a standard setting value of the parameter is denoted by a triangular marker. In addition, as shown in FIG. 6, the slide bar is configured by number lines representing development parameters that can be represented in one-dimensional numeric values and the marker that represents the parameter value. In addition, based on these development parameters, parameters that are used in an actual development process to be described later are generated. Accordingly, these parameters may be also regarded as parameters relating to the development parameters.

The entire development parameter setting area RP0 of the reference display screen SAG represents no acceptance of change of the development parameters from a user, and thus, the development parameter setting area RP0 is represented in a thin color (gray out). According to this embodiment, the markers are set not to be moved by a user's operation, and whereby acceptance of the change is prohibited. The parameters displayed in the development parameter setting area RP0 will be described later.

A3. Generation of Raw Image

In Step S106 shown in FIG. 4, the CPU 210 generates a raw image. The generation of the raw image is a process for taking out the image data from the raw data area shown in FIG. 2 and performing an expansion process or the like for the compressed data. Here, the raw image is an intermediate image for which processes such as pixel interpolation and color conversion among various processes (to be described later) performed in the development process are not performed. The CPU 210 generates the raw image by taking out the raw data from the raw image file (FIG. 2) and performing a predetermined process for the raw data.

Figure 7:
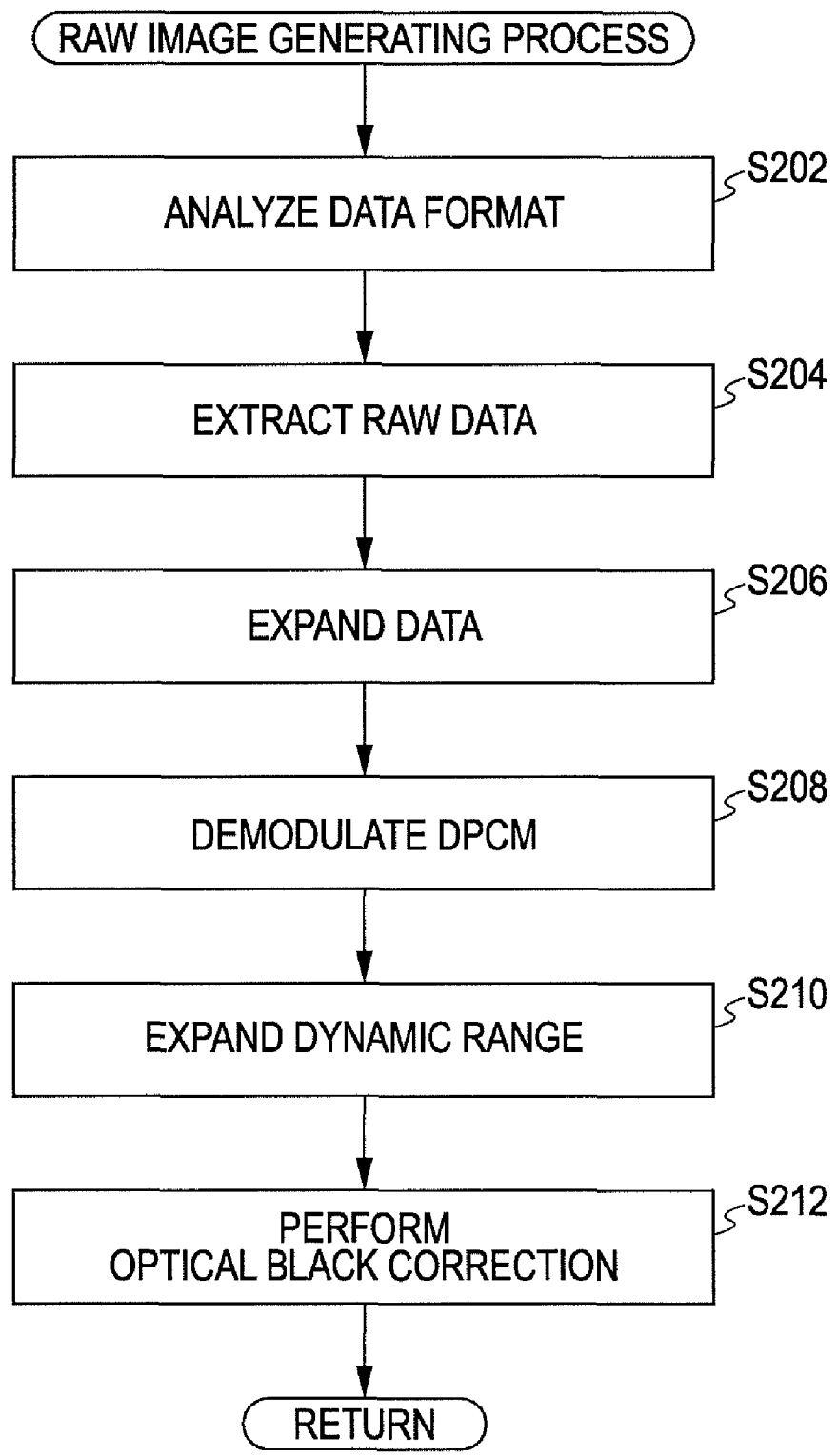
FIG. 7 is a flowchart showing an example of the raw image generating process performed in Step S106.

FIG. 7 is a flowchart showing an example of the raw image generating process performed in Step S106. In addition, the raw image generating process shown in FIG. 7 is appropriately changed in accordance with the format of the raw image data and the like.

In Step S202, the CPU 210 analyzes the data format of the raw image file (FIG. 2). As described above, the data format of the raw image file differs in accordance with the maker or the model of the digital still camera 100 (FIG. 1). Accordingly, the CPU 210 determines the data format of the raw image file based on information such as the maker and the product number that are stored in the header portion and acquires the stored location and storage format of the raw data. In addition, according to this embodiment, the data format of the raw image file is determined based on the information that is stored in the header portion of the raw image file. However, the data format of the raw image file may be determined based on the extension that is assigned to the raw image file depending on the raw image file. For example, a method in which the data format is determined as a data format produced by company E based on the extension for "EPSN0012.ERF", and the data format is determined as a data format produced by company A based on the extension of "ADSC0125.ARF" may be used.

In Step S204, the CPU 210 takes out the raw data that is stored in the raw image file and stores the raw data in the RAM 230 (FIG. 3). Next, in Step S206, for the raw data stored in the RAM, a data expanding process is performed. Usually, for the raw data, a reversible compressing process (for example, Huffman coding) is performed for reducing the data size thereof. In Step S206, a process (referred to as "expansion") for converting the compressed data into data before compression is performed. When the raw data is compressed by Huffman coding of the previous example, a Huffman decompressing (expanding) process is performed for the corresponding Huffman-coded data.

In Step S208, the CPU 210 performs reverse conversion (DPCM demodulation) of a differential pulse coded modulation (DPCM) that is performed at the time of generation of the raw data. Next, in Step S210, the compressed dynamic range is expanded.

In Step S212, the CPU 210 performs an optical black correcting process. This process is a process of subtracting an offset value, which is added to the raw data for correcting the characteristic of an image pickup element of the camera, that is, the characteristic that a detection value is not zero for a case where the intensity of the incident light is zero, from the raw data. In this process, the offset value is subtracted from the gray scale value of each pixel that is included in the raw data. In addition, as the subtracted offset value, for example, a value that is stored in the header portion of the raw image file (FIG. 2) may be used. Usually, the output of the image pickup element includes a noise component. Accordingly, when this output signal is A/D-converted, the noise component is A/D-converted together, commonly. When a value corresponding to the raw data at the time of zero intensity of the incident light is set to zero, a noise for the positive direction is recorded in the raw data as a positive value, and a noise having a negative value is clamped to zero. Accordingly, the noise component is not recorded correctly. Thus, when the resultant noise component is smoothed, a positive-side value corresponding to the noise component is acquired. The above-described process is performed in consideration of preventing acquisition of the positive-side value. In other words, for example, in a case where a value corresponding to the raw data at the time of zero intensity of the incident light is 64, when a positive noise has a value of +1, the raw data is recorded as 65. On the other hand, when a negative noise has a value of −1, the raw data is recorded as 63. Then, by subtracting the offset value of 64 from the recorded values, values of +1 and −1 are acquired. As a result, it is possible to process the raw data including the noise correctly. In addition, a problem that the amount of data is increased due to addition of a bit recording width for a case where a sign is attached to the raw data in consideration of a negative noise can be solved. As described above, the data after the optical black correction is performed is calculated to be a negative value to which a sign is attached.

As described above, a raw image that represents the amount of light incident to each pixel of the image pickup element of the digital still camera 100 is generated based on the raw image file. In addition, hereinafter, the "raw image" represents data that represents the amount of light incident to each pixel of the image pickup element as described above. In addition, generally, the raw image is represented by data having the gray scale value of each pixel of 12 bits or more. Accordingly, generally, a calculation process, which is performed in the development process, is performed in 16 bits including a sign, so that any missing of information included in the raw image does not occur. Thus, hereinafter, unless otherwise mentioned, the calculation process is assumed to be performed in 16 bits. However, it is apparent that a bit length for the calculation process is not limited to 16 bits. Thus, as the bit length for the calculation process, a different number of bits may be used.

A4. Automatic Adjustment of Development Parameters

In Step S108 shown in FIG. 4, the CPU 210 determines whether the adjustment mode of the development parameters is the automatic adjustment mode. When the adjustment mode of the development parameters is the automatic adjustment mode, the process proceeds to Step S110. On the other hand, when the adjustment mode of the development parameters is the manual adjustment mode, the process proceeds to Step S114. In such a case, standard parameters determined in advance are set as the development parameters. Alternatively, by omitting Step S108 so as to perform Step S110 after Step S106, the development parameters may be set so as to be automatically adjusted all the time. In such a case, display of the menu screen MN2 shown in FIG. 5B is omitted in Step S102.

Figure 8:
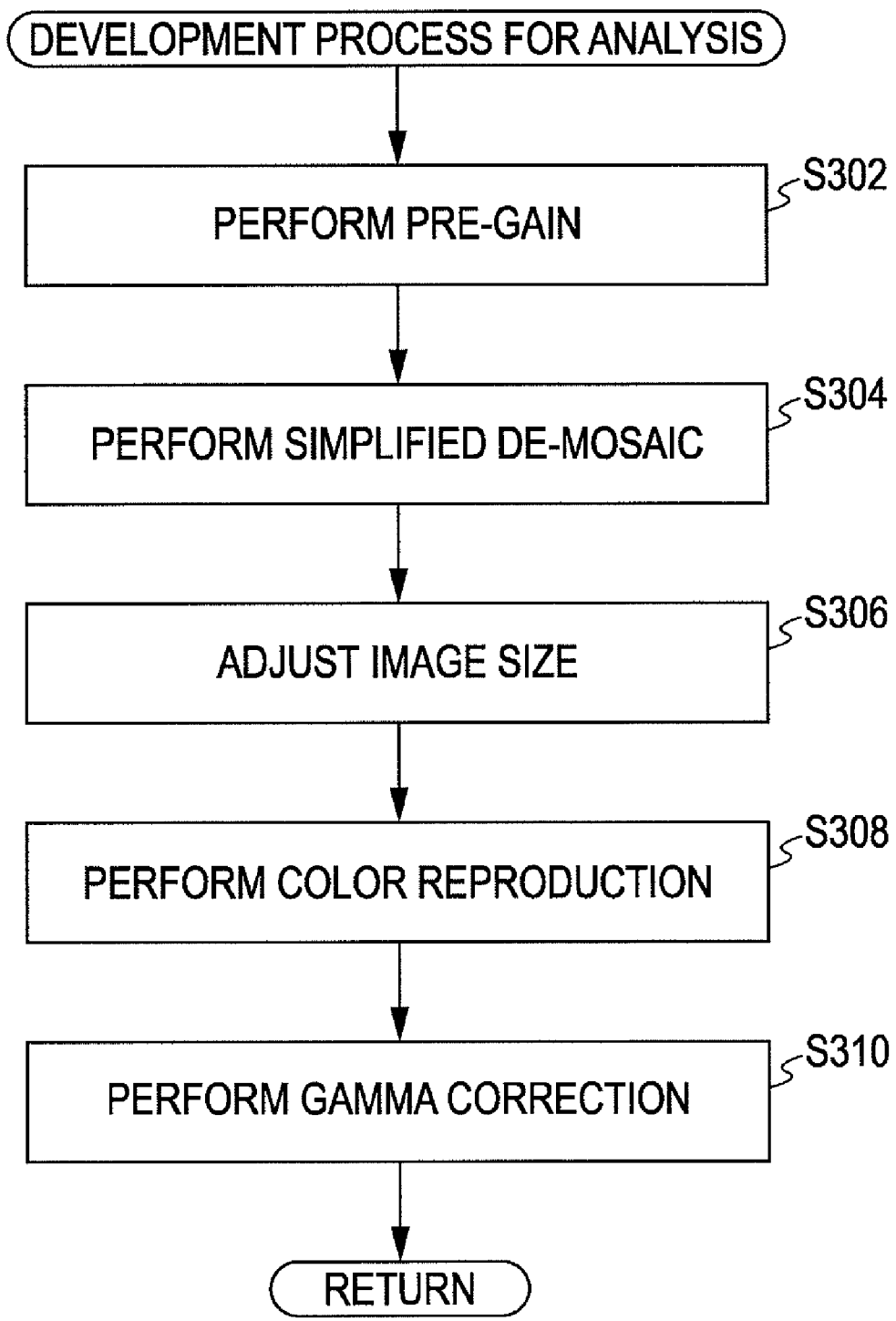
FIG. 8 is a flowchart showing the flow of a development process for analysis that is performed in Step S110.

In Step S110, the CPU 210 generates an analysis image for adjusting the development parameters by performing a development process for analysis. FIG. 8 is a flowchart showing the flow of the development process for analysis that is performed in Step S110.

In Step S302, the CPU 210 performs a gain adjusting process (pre-gain) for the raw image. In particular, the CPU 210 multiplies the pixel value (RGB value) of each pixel of the raw image by a coefficient (pre-gain setting value) that is set in accordance with the characteristics of the image pickup element of the digital still camera 100. By using the pre-gain, a difference of the gains of the pixels of RGB is adjusted. Thus, generally, a multiplication operation is not performed for the pixels of G, and only the pixel values of pixels of R and G are multiplied by the pre-gain setting values. Generally, the pre-gain setting value is stored in the header portion of the raw image file (FIG. 2). Accordingly, in Step S302, the gain adjusting process is performed by using the pre-gain setting values that are stored in the header portion as described above. In addition, an image (an image for which gain adjusting is completed) for which the gain adjusting process is performed is stored in the RAM 230 (FIG. 3). In addition, in the main development process to be described later, a gain adjusting process is omitted by using the image for which the gain adjustment is completed.

In Step S304, the CPU 210 performs a de-mosaic process. Generally, the de-mosaic process is a process for interpolating and generating information on colors that lack in each pixel due to arrangement of color filters, which is called a Bayer pattern, that are disposed in the image pickup element of the digital still camera 100 (FIG. 1). However, in Step S304, since an image that has resolution lower than that of the raw image is generated, the CPU 210 performs the simple de-mosaic process for thinning out pixels replaced in the interpolation process. The image (reduced RGB image) in which the simple de-mosaic process is performed for the raw data is stored in the RAM 230 (FIG. 3), and in the development process for display to be described later, the de-mosaic process is omitted.

FIGS. 9A and 9B are explanatory diagrams showing the appearance of performing the simple de-mosaic process for the raw image. As shown in FIG. 9A, in the image pickup element of the digital still camera 100 (FIG. 1), color filters of RGB primary colors are disposed in a check pattern (referred to as a "Bayer pattern") in correspondence with sensor elements that are formed on the light receiving face of the image pickup element. Accordingly, a pixel of the raw image corresponding to each sensor element of the image pickup element becomes a pixel that has color information for one color of RGB only. For example, when the pixel is an R pixel, color information of G and B lacks in the position of the pixel.

In the simple de-mosaic process, one pixel (RGB pixels) that has all color information of RGB is generated from a 4×4 pixel area. In particular, as shown in FIG. 9B, one R pixel, one G pixel, and one B pixel are selected from the 4×4 pixel area. Then, the RGB values of the selected pixels are set as the RGB values of the RGB pixel. In addition, as shown in FIG. 9C, one RGB pixel is generated for the 4×4 pixel area. As described above, by generating one RGB pixel from the 4×4 pixel area, a one-fourth reduction process can be performed in the simple de-mosaic process. In addition, the size of the pixel area that is used for generation of one RGB pixel can be set appropriately based on the amount of reduction of the simple de-mosaic process. The size of the area for generating one RGB pixel, for example, may be 5×5, 3×3, or 2×2. In addition, as the R pixel, the G pixel, and the B pixel (used pixels), which are used for generation of the RGB pixel, located within the 4×4 pixel area, any pixel located within the 4×4 pixel area may be used. In addition, according to this embodiment, the pixel values of the selected pixels of R, G, and B located within the 4×4 pixel area are set as RGB values of the RGB pixel. However, the RGB values of the RGB pixel may be set by using a different method. For example, average values of pixel values of pixels of R, G, and B located within the 4×4 pixel area may be set as the RGB values of the RGB pixel.

In Step S306 shown in FIG. 8, the CPU 210 adjusts the size of the reduced RGB image for which the simple de-mosaic process is performed. In particular, the CPU 210 adjusts the size of the image to be appropriate for analysis by performing a trimming and reducing process further for the reduced RGB image that is reduced to one-fourth from the raw image by performing the simple de-mosaic process.

FIGS. 10A, 10B, and 10C are explanatory diagrams showing the appearance of generating an image of the QVGA size (320×240 pixels) from a raw image of 3024×2016 pixels by performing the simple de-mosaic process (Step S306) and an image size adjusting process (Step S308). Generally, a ratio (referred to as an "aspect ratio") of the number of pixels of the raw image of the digital still camera for the horizontal direction to the number of pixels for the vertical direction is adjusted to a film camera of 35 mm so as to set to be 3:2.

The raw image shown in FIG. 10A is reduced to one-fourth by performing the simple de-mosaic process. Accordingly, as shown in FIG. 10B, the size of the reduced RGB image becomes 756×504 pixels. Next, the aspect ratio of the reduced RGB image is adjusted to 4:3 of the QVGA size, and thus, a trimming process for cutting 42 pixels on the left side and 42 pixels on the right side is performed. The size of the image after performing the trimming process, which is denoted by a thick line shown in FIG. 10B, becomes 672×504 pixels of the 4:3 aspect ratio. For the image for which the aspect ratio is adjusted as described above, a reduction process is performed further, and an RGB analysis image that has the QVGA size shown in FIG. 10C is generated. In addition, for the reduction process for generation of the analysis image from the RGB analysis image after performing the trimming process, a known reduction process such as a nearest neighbor method or a bi-linear method can be used.

In Step S308 shown in FIG. 8, the CPU 210 performs a color reproducing process for the RGB analysis image. The color reproducing process is a process for reproducing correct colors by correcting a difference between the spectral sensitivity characteristic of the image pickup element and the human's luminosity characteristic by adjusting the RGB values in accordance with the human's luminosity characteristic. The color reproducing process is performed by multiplying a three-dimensional vector having R, G, and B values as its components by a 3×3 matrix having elements of correction coefficients (operation of a 3×3 matrix). Usually, these correction coefficients differ in accordance with the model of the camera. Accordingly, as the correction coefficients, correction coefficients that are prepared in advance in accordance with the model of camera determined by analyzing the raw image file are used.

In Step S310, the CPU 210 performs a gray scale correction (gamma correction) for correcting the gray scale characteristic. In this embodiment, as a gamma value (γ) used for performing gamma correction in the development process for analysis, "2.2" that is used in a general gamma correction process is used. In addition, the gray scale correction of Step S310 is almost the same as the gray scale correction that is performed as a main development process of Step S122.

In Step S112 shown in FIG. 4, the CPU 210 analyzes the image (reduced image) that is generated by performing the color reproducing process and the gamma correction process for the RGB analysis image, that is, the image for which the process of Step S110 is performed. Then, the CPU 210 sets various development parameters such as an exposure correcting coefficient, a white balance setting value, a color correcting value, and a contrast adjusting value based on the result of analysis of the reduced image.

Figure 11A:
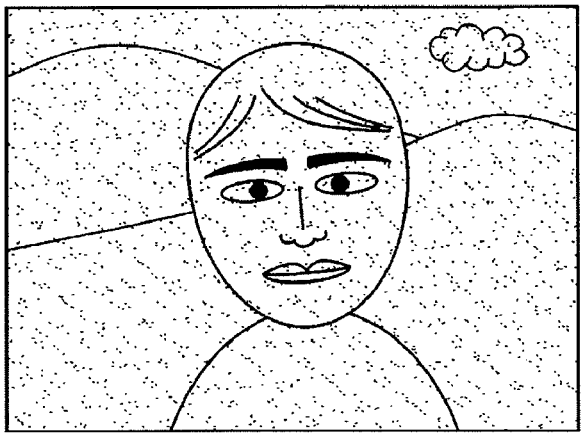
FIGS. 11A to 11D are explanatory diagrams showing the appearance of setting an exposure coefficient among the development parameters.
Figure 11B:
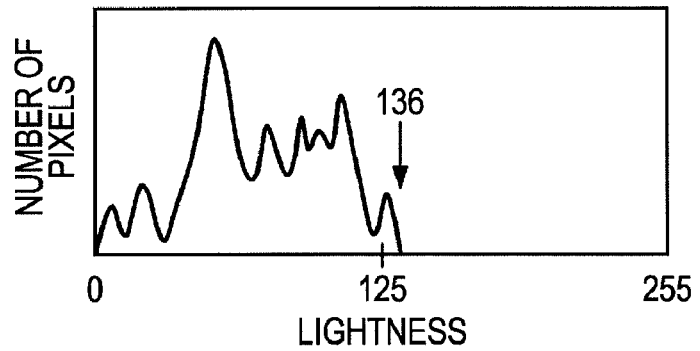
Figure 11C:
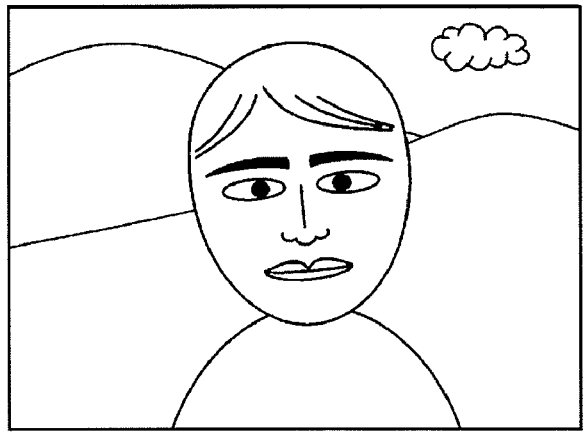
Figure 11D:
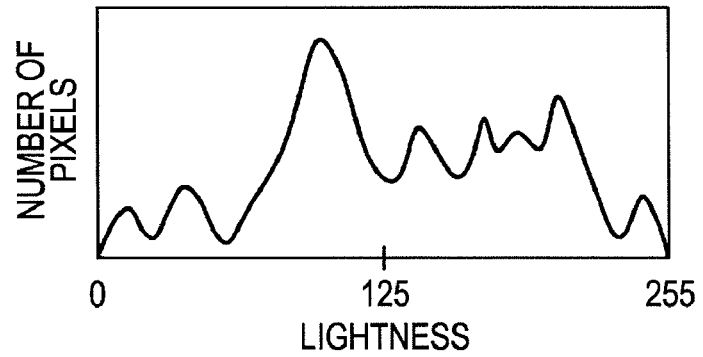

FIGS. 11A to 11D are one example of setting the development parameters in Step S112. FIGS. 11A to 11D show the appearance of setting the exposure correcting coefficient by performing histogram analysis. FIGS. 11A and 11C represent an image of which exposure is insufficient (exposure-under) and an image of which exposure is appropriate. FIG. 11B is a graph showing the result of the histogram analysis of the exposure-under image shown in FIG. 11A. FIG. 11D is a graph showing the result of the histogram analysis of the image, of which exposure is appropriate, shown in FIG. 11C. In the graphs shown in FIGS. 11B and 11D, the horizontal axes represent the lightness (gray scale value), and the vertical axes represent the number of pixels.

As shown in FIG. 11B, in the exposure-under image, the number of pixels located in an area having high lightness is small. In the example shown in FIG. 11B, in the entire range (0 to 255) of the lightness, most of the pixels are distributed in a low-lightness area (0 to 136), and the number of pixels positioned in a high-lightness area (137 to 255) is almost zero. On the other hand, as shown in FIG. 11D, in the image of which exposure is appropriate, the pixels are distributed over the entire range (0 to 255) of the lightness. Accordingly, in order to convert the exposure-under image shown in FIG. 11A into the image, of which exposure is appropriate, shown in FIG. 11C, it can be determined that exposure correction for converting the lightness of 136 into the lightness of 255 is performed, so that the pattern of the histogram is distributed over the entire range of the lightness as shown in FIG. 11D. In addition, the target pattern of the histogram as described above can be determined based on the distribution range of the pixels.

As described above, the reduced image that is used for analysis is the image acquired from performing the gamma correction for the reduced RGB image. In particular, the lightness Y of the reduced image can be represented in the following Equation (1) by using the lightness X of the reduced RGB image.

$$Y = X^{1/\gamma} \qquad \text{Equation (1)}$$

Accordingly, in order to convert the exposure-under image shown in FIG. 11A into the image, of which exposure is appropriate, shown in FIG. 11C, as a correction coefficient A to be multiplied by the lightness of the raw image, a value represented by the following Equation (2) is set.

$$A = (255/136)^{\gamma} \qquad \text{Equation (2)}$$

In the gamma correction performed for generating the reduced image, γ is set to "2.2". Accordingly, for the exposure-under image shown in FIG. 11A, the correction coefficient A to be multiplied by to the lightness of the raw image is calculated to be about "4.0". In addition, in a case other than the case where 2.2, which is generally used, is used as the gamma value γ, a gray scale correcting curve acquired from combining a contrast correcting curve as image formation and a brightness correcting curve for absorbing a difference of brightness of cameras may be used. In such a case, as a curve used for correcting the gray scale, a combination curve acquired from combining the contrast correcting curve as image formation and the brightness correcting curve for absorbing a difference of brightness of the cameras is used. Accordingly, the correction coefficient A is acquired by performing calculation of reverse correction of the combination curve. However, the way of thinking is the same those in Equations (1) and (2).

In addition, according to this embodiment, the exposure correcting coefficient is calculated based on the result of the histogram analysis. However, the exposure correcting coefficient may be acquired by using a different method. For example, it may be configured that a face is detected from the reduced image, and the exposure correcting coefficient is calculated based on the lightness of the detected face. In such a case, the lightness of an area that has hue and chroma corresponding to the skin color of a nose, a mouth, and the peripheries of eyes of the detected face is evaluated. The exposure correcting coefficient is determined such that the lightness of the evaluated area is within desired brightness as the lightness of the skin color. The lightness of the evaluated area is calculated as described above, for example, so as to be within the range of 180 to 200.

Other development parameters are set by using methods according to the development parameters. For example, the white balance setting value is set such that the chroma of a detected white area becomes almost zero by detecting the white area that is included in the reduced image. The color correcting value is set such that the color of a detected subject is within a target range of colors by detecting the subject (for example, sky or a face) of a specific type that is included in the reduced image. In addition, the contrast correcting value is set based on the type of a subject by specifying the subject represented by the reduced image. For example, when the subject is a landscape, the contrast correcting value is set to a high value. On the other hand, when the subject is a person, the contrast correcting value is set to a low value.

A5. Development Process for Display

Figure 12:
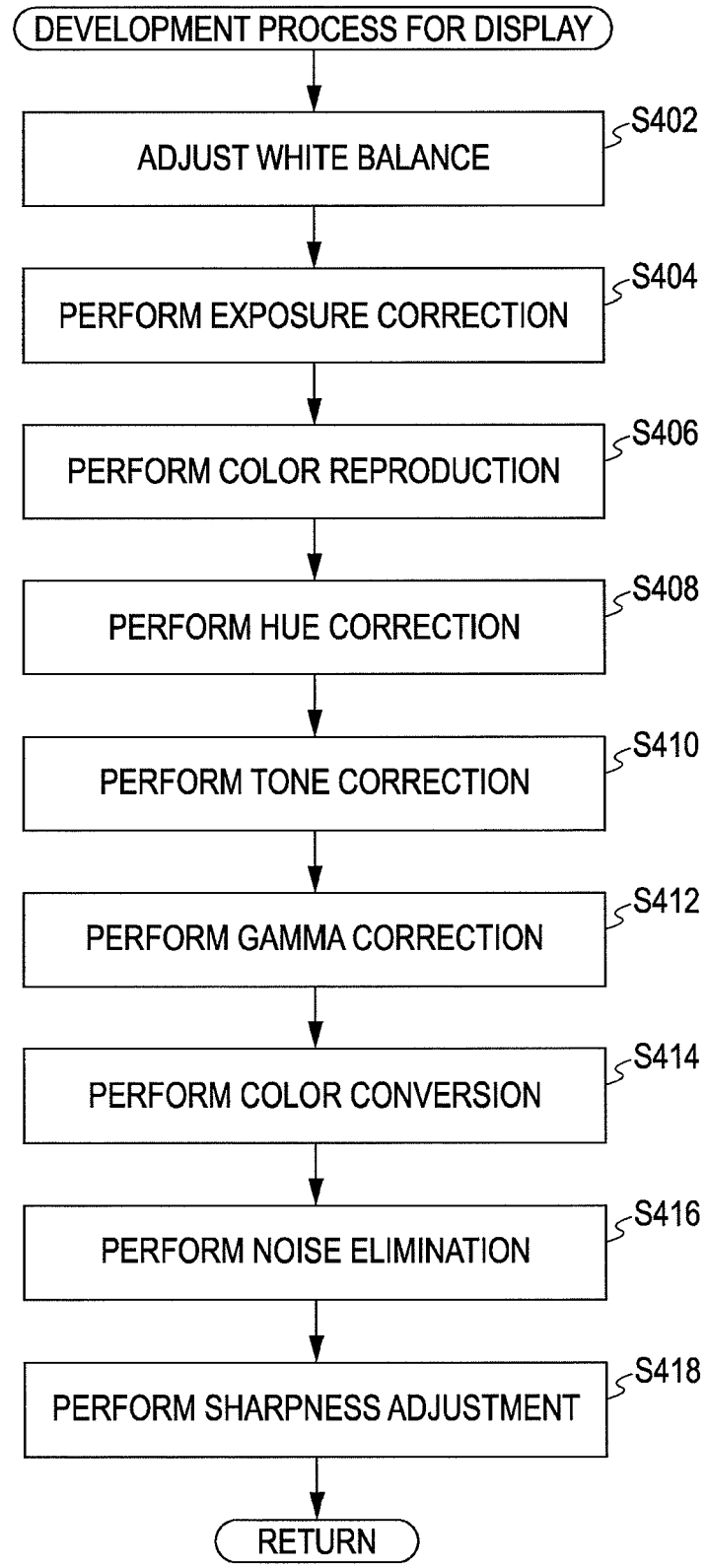
FIG. 12 is a flowchart showing the flow of a development process for display performed in Step S114.

In Step S114 shown in FIG. 4, the CPU 210 performs a development process for display. FIG. 12 is a flowchart showing the flow of the development process for display that is performed in Step S114. In the development process for display, as described above, the reduced RGB image, for which the simple de-mosaic process is performed, is processed.

In Step S402, the CPU 210 performs a white balance adjusting process. The white balance adjusting process is performed by multiplying the RGB values of pixels configuring the reduced RGB image by coefficients that are set for each target white balance. In particular, an R value and a B value of each pixel of the raw image can be multiplied by coefficients Ar and Ab. These coefficients Ar and Ab are determined based on the white balance setting value that is set in Step S112 shown in FIG. 4 or a white balance setting value (color temperature and color cast correction) that is changed by a user as described later. Alternatively, these coefficients Ar and Ab may be configured to be determined based on the content of settings of the white balance that is described in the header portion of the raw image file (FIG. 2).

In Step S404, the CPU 210 performs an exposure correcting process. The exposure correcting process is performed by multiplying the R value, the G value, and the B value of each pixel of the reduced RGB image by a same exposure correcting coefficient Ga. As described above, multiplying the R value, the G value, and the B value by the same coefficient corresponds to increasing or decreasing the amount of light incident to the image pickup element of the digital still camera 100. Accordingly, by performing the exposure correcting process, a same effect as is acquired by changing the amount of exposure in a photographing step by using the digital still camera 100 is acquired. As the exposure correcting coefficient Ga, as described above, the exposure correcting coefficient that is determined by performing the histogram analysis of the reduced image or an exposure correcting coefficient that is changed by the user is used.

In Step S406, the CPU 210 performs a color reproducing process. The color reproducing process of Step S406 is a process that is the same as the color reproducing process performed in Step S308 of the development process for analysis shown in FIG. 8. The color reproducing process of Step S406 is performed by operating a 3×3 matrix.

In Step S408, the CPU 210 performs a color correcting process. The color correcting process, same as the color reproducing process, is performed by operating a 3×3 matrix. The elements of the 3×3 matrix that are used for the color correcting process are set based on the rotation angles of target colors. The rotation angle of the color is determined based on the color correcting value set in Step S112 shown in FIG. 4 or a color correcting value (tone) changed by a user as described later.

As described above, in the white balance adjusting process and the exposure correcting process, the RGB values are multiplied by a predetermined correction coefficient. In addition, in the color reproducing process and the color correcting process, an operation of a 3×3 matrix is performed. These processes are performed by linear operations, and the calculation process performed in Steps S402 to S408 of the development process for display that is shown in FIG. 12 is represented in the following Equation (3).

[Number 1]

Equation (3)

$$\begin{pmatrix} r' \\ g' \\ b' \end{pmatrix} = \begin{pmatrix} H_{11} & H_{12} & H_{13} \\ H_{21} & H_{22} & H_{23} \\ H_{31} & H_{32} & H_{33} \end{pmatrix} \quad (3)$$

$$\begin{pmatrix} C_{11} & C_{12} & C_{13} \\ C_{21} & C_{22} & C_{23} \\ C_{31} & C_{32} & C_{33} \end{pmatrix} \begin{pmatrix} Ga & 0 & 0 \\ 0 & Ga & 0 \\ 0 & 0 & Ga \end{pmatrix} \begin{pmatrix} Ar & 0 & 0 \\ 0 & 1 & 0 \\ 0 & 0 & Ab \end{pmatrix} \begin{pmatrix} r \\ g \\ b \end{pmatrix}$$

Here, a vector (r, g, b) represents the RGB values before the calculation process (that is, the reduced RGB image) performed in Steps S402 to S408, and a vector (r', g', b') represents the RGB values after the calculation process performed in Steps S402 to S408. A matrix of Equation (3) sequentially represents matrices used for the white balance adjustment, the exposure correction, the color reproduction, and color correction from the right side. According to this embodiment, each value of the vector (r, g, b) is a numeric value in 12 bits (or a numeric value in 12 bits to which a sign is added). In addition, elements of each matrix shown in Equation (3) are numeric values in 16 bits to which a sign is added.

Accordingly, in Steps S402 to S408, by performing multiplications of these matrices in advance, a single matrix (correction processing matrix) is generated. In addition, by performing the following calculation process of Equation (4) by using a correction processing matrix, the processes for the white balance adjustment, the exposure correction, the color reproduction, and the color correction are performed altogether.

[Number 2]

Equation (4)

$$\begin{pmatrix} r' \\ g' \\ b' \end{pmatrix} = \begin{pmatrix} M_{11} & M_{12} & M_{13} \\ M_{21} & M_{22} & M_{23} \\ M_{31} & M_{32} & M_{33} \end{pmatrix} \begin{pmatrix} r \\ g \\ b \end{pmatrix} \quad (4)$$

Here, a matrix of Equation (4) is a correction processing matrix that is acquired by multiplying the matrices of Equation (3). Each element of the matrix of Equation (4) has also precision of 16 bits to which a sign is added. In addition, calculation of the elements is performed at the precision of 32 bits, so that saturation or a decrease in the precision does not occur in the calculation process in Equation (3). Finally, the result is arranged in 16 bits. In addition, also in the process of Equation (4), calculation is performed, so that saturation or the like does not occur.

In Step S410, the CPU 210 performs a tone correcting process. In the tone correcting process, a gray scale value of the reduced RGB image is corrected by using a tone curve that represents relationship between an input gray scale value and an output gray scale value. It is determined based on the contrast adjusting value set in Step S112 shown in FIG. 4 or a contrast adjusting value that is changed by a user as described later.

In Step S412, the CPU 210 performs gamma correction. As a gamma value ($\gamma$) that is used for the gamma correction in Step S412, a value corresponding to the display characteristic of the liquid crystal display device 242 is used. In addition, as the gamma value ($\gamma$) corresponding to the display characteristic, 2.2 is used generally.

In Step S414, the CPU 210 performs a color converting process. This color converting process is a process for converting the RGB values of the raw image as color information in an RGB space into values of color components in a YUV color space that can be accepted by the display controller 240 (FIG. 3). The color converting process, similarly to the color reproducing process (Step S406 and Step S308 shown in FIG. 8) and the color correcting process (Step S408), is performed by an operation of 3×3 matrices, as well.

In Step S416, the CPU 210 performs a noise removing process. The noise removing process is a process for generating a clear image by removing a noise component that exists in an image. The noise removing process, for example, may be performed by using a Gaussian filter.

In Step S418, the CPU 210 performs a sharpness adjusting process. The sharpness adjusting (that is, an edge enhancing process) is a process for acquiring a clear image by correcting blurring of a contour within the image that is caused by influence of an optical low pass filter disposed in the image pickup element. Alternatively, the noise removing process of Step S416 and the sharpness adjusting process of Step S418 may be configured to be performed before the tone correction of Step S410. In descriptions here, "undeveloped image data" represents data that includes data in the process of a series of development processes performed for the raw data.

A6. Display of Preview Screen

In Step S116 shown in FIG. 4, a preview screen that includes an image (a display image) that is acquired from performing the development process for display for the reduced RGB image, as described above, is displayed in the liquid crystal display device 242. After displaying the preview screen, the CPU 210 waits for a user's specific operation. In particular, when the user performs any operation among the change of the development parameters, shift of the development parameter adjusting mode to the automatic adjustment mode, and a direction for main development, the process proceeds to Step S118. On the other hand, when the user operates the cancel button BRT (FIG. 3), the development process of FIG. 4 is stopped.

In addition, in display of the preview screen, trimming and reducing of the display image are performed appropriately. As shown in FIGS. 10A, 10B, and 10C, when the size of the reduced RGB image is 756×504 pixels, the size of the display image becomes 756×504 pixels, as well. A trimming process of cutting out each two pixels on the upper side, the lower side, the left side, and the right side is performed for this display image, and thus, a display image of 752×500 pixels is displayed on the preview screen. In addition, a reduction process is performed further for the display image after the trimming process, and an image that is smaller in size (for example, an image of 600×400 pixels) is displayed on the preview screen, depending on the liquid crystal display device 242 (FIG. 3) or the form of the preview screen.

Figure 13:
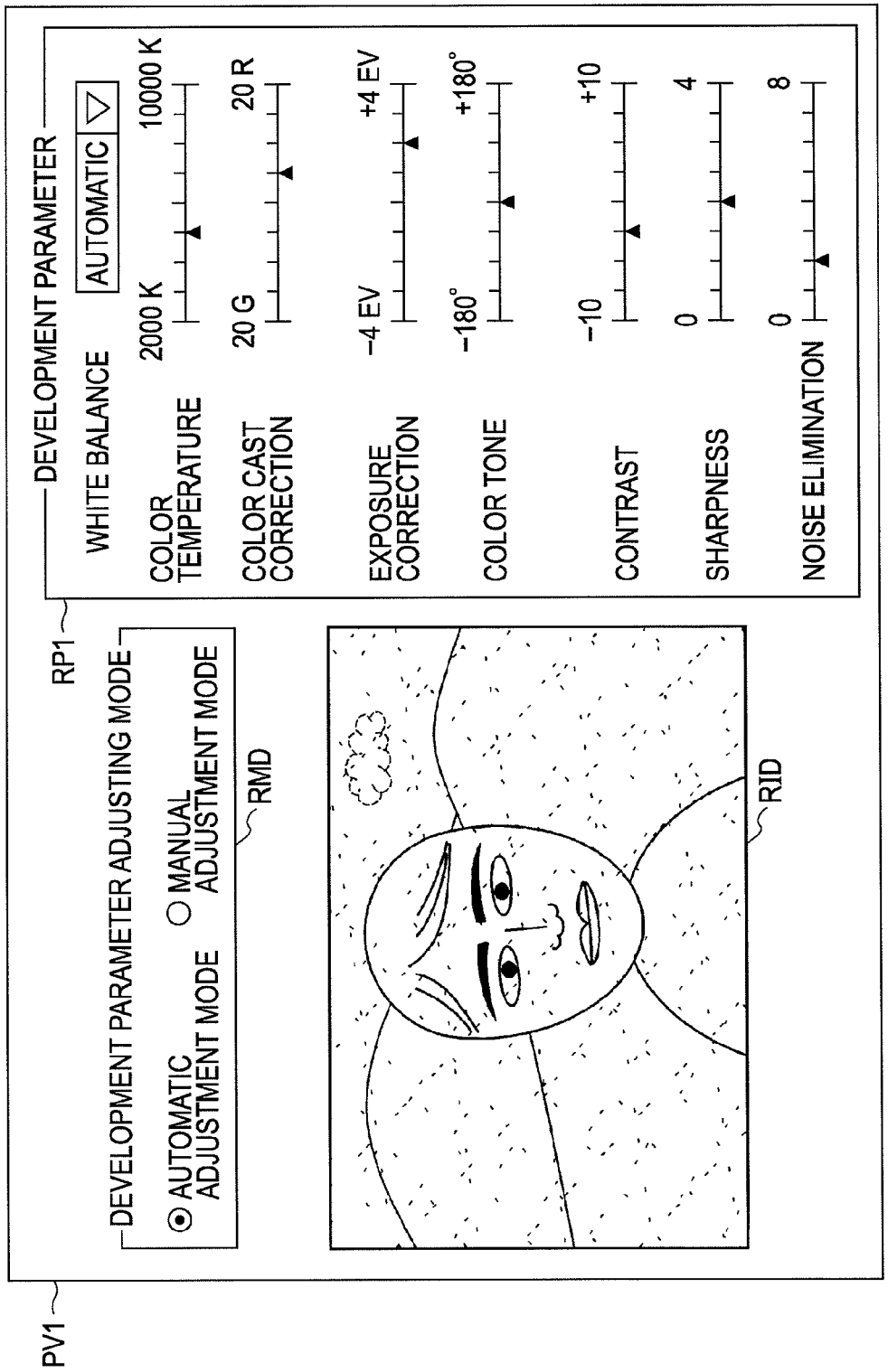
FIG. 13 is an explanatory diagram showing one example of a preview screen PV1 that is displayed in the liquid crystal display device in Step S116.

FIG. 13 is an explanatory diagram showing one example of the preview screen PV1 that is displayed in the liquid crystal display device 242 in Step S116. As shown in FIG. 13, in the preview screen PV1, a display image displaying area RID in which a display image is displayed, an adjustment mode setting area RMD, and a development parameter setting area RP1 are disposed.

As shown in FIG. 13, in the development parameter setting area RP1, similar to the reference display screen SAG (FIG. 6), slide bars are disposed for "color temperature" and "color cast correction", "exposure", "tone", "contrast", "sharpness", and "noise removal". In the example shown in FIG. 13, among the development parameters that are automatically adjusted, the "color temperature", the "color cast correction", the "exposure", and the "contrast" are adjusted to values other than the standard parameters. Accordingly, corresponding markers are set in positions different from the positions of the standard parameters. On the other hand, among the development parameters that are automatically adjusted, a marker for the "tone" that is not changed from the standard parameter is set in the position of the standard parameter. In addition, the development parameters (the sharpness and the noise removal) that are not automatically adjusted are maintained to be the standard parameters.

In the preview screen PV1 as shown in FIG. 13, acceptance of a change operation is represented. Accordingly, the grayout of the development parameter setting area RP1 is released. By accepting the change operation, the position of the marker of each slide bar is changed in accordance with the user's operation. By horizontally moving the marker of a slide bar by operating the direction button BDR and the like that are disposed in the photo viewer 200 (FIG. 3), the user can change a development parameter corresponding thereto.

In Step S118 shown in FIG. 4, the CPU 210 determines whether the user's operation changes the development parameter. When the user's operation is determined to change the development parameter, the process returns back to Step S114. Then, the development process for display (Step S114) is performed again based on the changed development parameter, and a preview screen that includes the display image developed again in Step S116 is displayed.

Figure 14:
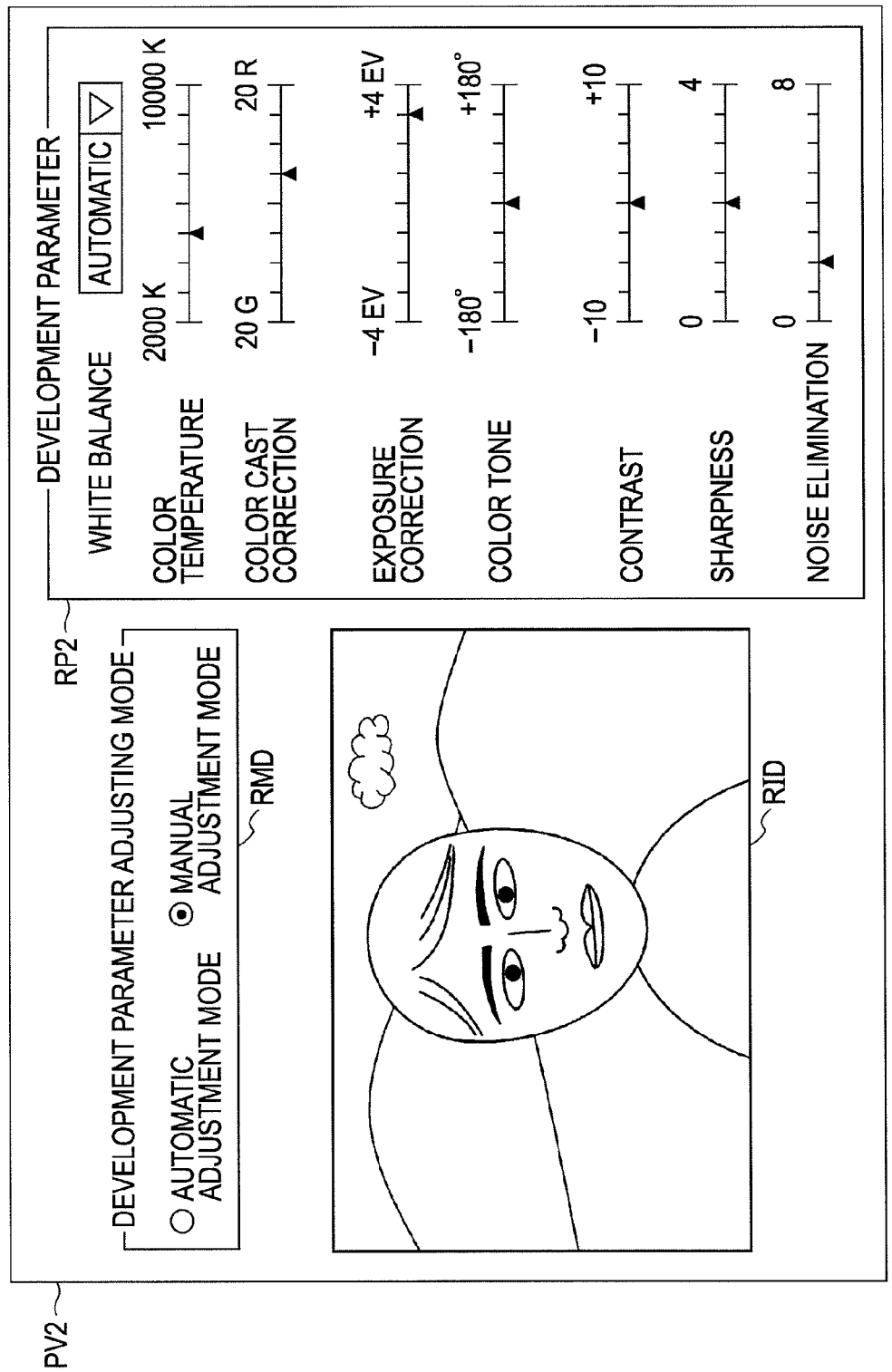
FIG. 14 is an explanatory diagram showing a preview screen that is displayed again after the development parameter is changed by a user.

FIG. 14 is an explanatory diagram showing a preview screen that is displayed again after the development parameter is changed by the user. In the example shown in FIG. 14, a state, in which a user changes the exposure correcting coefficient to +3 EV that is slightly higher than a setting value (+2 EV) set in accordance with the automatic adjustment and changes the contrast to zero that is slightly higher than the setting value (−2.5 EV) set in accordance with the automatic adjustment, is shown. As shown in FIG. 14, the markers of the slide bars located in the development parameter setting area RP2 are moved in accordance with the user's operation. In addition, the adjustment mode of the development parameters that is displayed in the adjustment mode setting area RMD is shifted from the automatic adjustment mode to the manual adjustment mode by accepting the user's change of the parameter. The display image represented in the display image displaying area RID is changed to an image that is brighter and has higher contrast than the image before the change.

When the user changes the adjustment mode of the development parameters to the automatic adjustment mode, in Step S118 shown in FIG. 4, the CPU 210 determines that the user's operation does not change the development parameters. Then, in step S120, the CPU 210 determines that the user's operation is the change to the automatic adjustment mode, and the process moves to Step S126.

Figure 15:
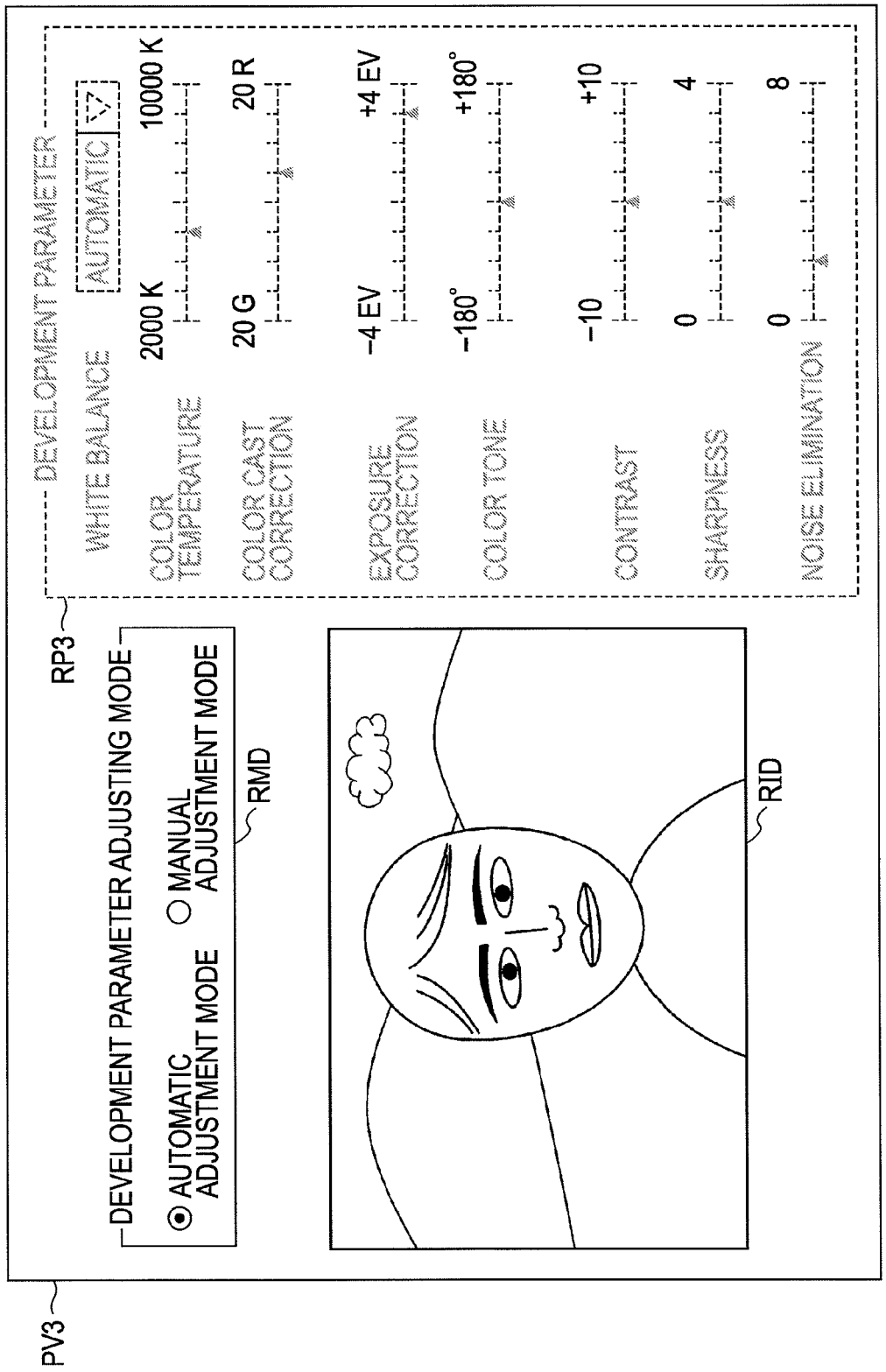
FIG. 15 is an explanatory diagram showing the state in which the development parameter setting area of the preview screen is grayed out in Step S126.

In Step S126, acceptance of a direction for changing the development parameter is prohibited. In addition, the development parameter setting area is grayed-out for representing prohibition of acceptance of a change direction. FIG. 15 is an explanatory diagram showing the state in which the development parameter setting area of the preview screen PV2 is grayed out in Step S126. A preview screen PV3 shown in FIG. 15 is different from the preview screen PV2 shown in FIG. 14 that the development parameter setting area RP3 is grayed-out, and the adjustment mode represented in the adjustment mode setting area RMD is shifted to the automatic adjustment mode. Other aspects of the preview screen PV3 are the same as those of the preview screen PV2 shown in FIG. 14.

After the acceptance of the direction for changing the development parameter is prohibited in Step S126, the process is returned to Step S110, and the development of the analysis image and the setting of the development parameters are performed as described above. Then, in the liquid crystal display device 242, an initial preview screen PV1 is displayed. According to this embodiment, the process is returned to Step S110 after Step S126. However, it may be configured that automatically adjusted development parameters are stored in the RAM 230 (FIG. 3) in advance, and the development of the image for display (Step S114) is performed based on the stored development parameters. In such a case, after Step S126, the process is returned to Step S114.

When the user operates the OK button in a state in which the preview screen is displayed in Step S116, the CPU 210 determines that any of the change of the development parameters and the change of the adjustment mode of the development parameters to the automatic adjustment mode is not operated in Steps S118 and S120. Then, in Step S122, the CPU 210 performs the main development process.

A7. Main Development Process

Figure 16:
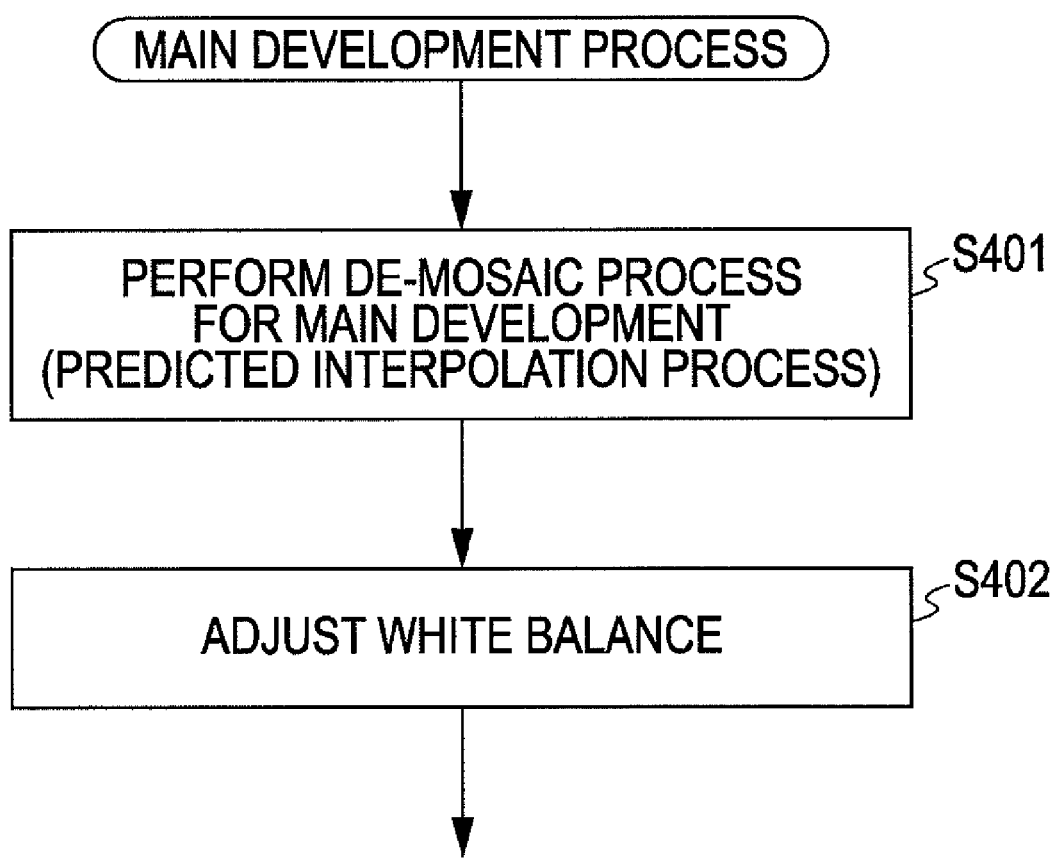
FIG. 16 is a flowchart showing the flow of a main development process.

FIG. 16 is a flowchart showing the flow of the main development process that is performed in Step S122. In the main development process, the process is performed based on the development parameters that are designated at the time point when the user operates the OK button. The main development process shown in FIG. 16 is different from the development process for display shown in FIG. 12 that Step S401 is added before the white balance adjusting process (Step S402), and a gamma value used in the gamma correcting process (Step S412) and the color space after conversion performed in the color converting process (Step S414) are set based on the format of output data. Other aspects of the main development process are the same as those of the development process for display shown in FIG. 12. Accordingly, in FIG. 16, processes of Step S404 and thereafter that are performed after the white balance adjusting process (Step S402) are omitted.

In Step S401, the CPU 210 performs a de-mosaic process (predicted interpolation process) for the main development for an image which is generated in Step S302 shown in FIG. 8, is stored in the RAM 230 (FIG. 3), and gain adjustment is completed for. The predicted interpolation process that is performed in Step S401 is a de-mosaic process in which insufficient color information is acquired by performing predicted interpolation based on color information of surrounding pixels. In the predicted interpolation process, the direction of the edge of the image is detected, and pixel interpolation is performed so as to follow the edge of the image. Accordingly, deterioration of the image quality due to incorrect interpolation such as coloring in the surrounding of the edge due to interpolation by using the color information of pixels arranged in the direction for extending over the edge can be suppressed.

In Step S124 shown in FIG. 4, the CPU 210 generates image data of a predetermined format for which development is completed based on the image generated by the main development process of Step S122. Then, the CPU 210 stores the generated image data for which development is completed in the HDD 270 or the memory card MC. When image data of a JPEG format is generated as the image data for which development is completed, 16 bit data that is used in the calculation process of the main development process is converted into 8 bit at the time of generation of the image data for which development is completed. Here, the format of the image data for which development is completed may be a format other than the JPEG format. Generally, as the format of the image data for which development is completed, any arbitrary format that is a standard image data format such as a TIFF format or a BMP format may be used. Alternatively, the image data for which development is completed may be conserved as the TIFF data of 16 bits without being converted into 8 bits.

Usually, even when a user changes the development parameters during a period in which a development parameter determining process is performed, the changed content is changed to the development parameters determined by the development parameter determining process when the development parameter determining process is completed. According to this embodiment, during a period in which a process for determining the development parameters is performed by performing automatic adjustment or the like, acceptance of a user's direction for changing the development parameters is prohibited. In addition, the parameter setting area provided in the user interface such as a reference display screen or a preview screen is grayed out. Accordingly, an unnecessary operation of changing the development parameters in a state in which the change is not reflected is suppressed. As a result, the convenience of adjustment of the development parameters is improved.

In addition, according to this embodiment, prohibition of acceptance of a user's direction for changing the development parameters is represented by gray-out of the entire parameter setting area. However, only the slide bars or the markers that are disposed in the slide bars may be configured to be grayed out. Generally, it may be configured that, an area (change area) for changing the development parameters that is disposed in the user interface such as the entire parameter setting area, the slide bar, or the marker is grayed out. Alternatively, the prohibition of acceptance of a user's direction for changing the development parameters may be represented by not displaying the change area instead of gray-out of the change area.

In addition, only the acceptance of a direction for changing the development parameters may be configured to be prohibited without gray-out or non-display of the change area. However, in consideration that the user can acquire a period in which acceptance of a user's direction for changing the development parameters is prohibited, it is preferable that the change area is represented by the gray-out or the non-display of the change area.

B. MODIFIED EXAMPLE OF PREVIEW SCREEN

Figure 17:
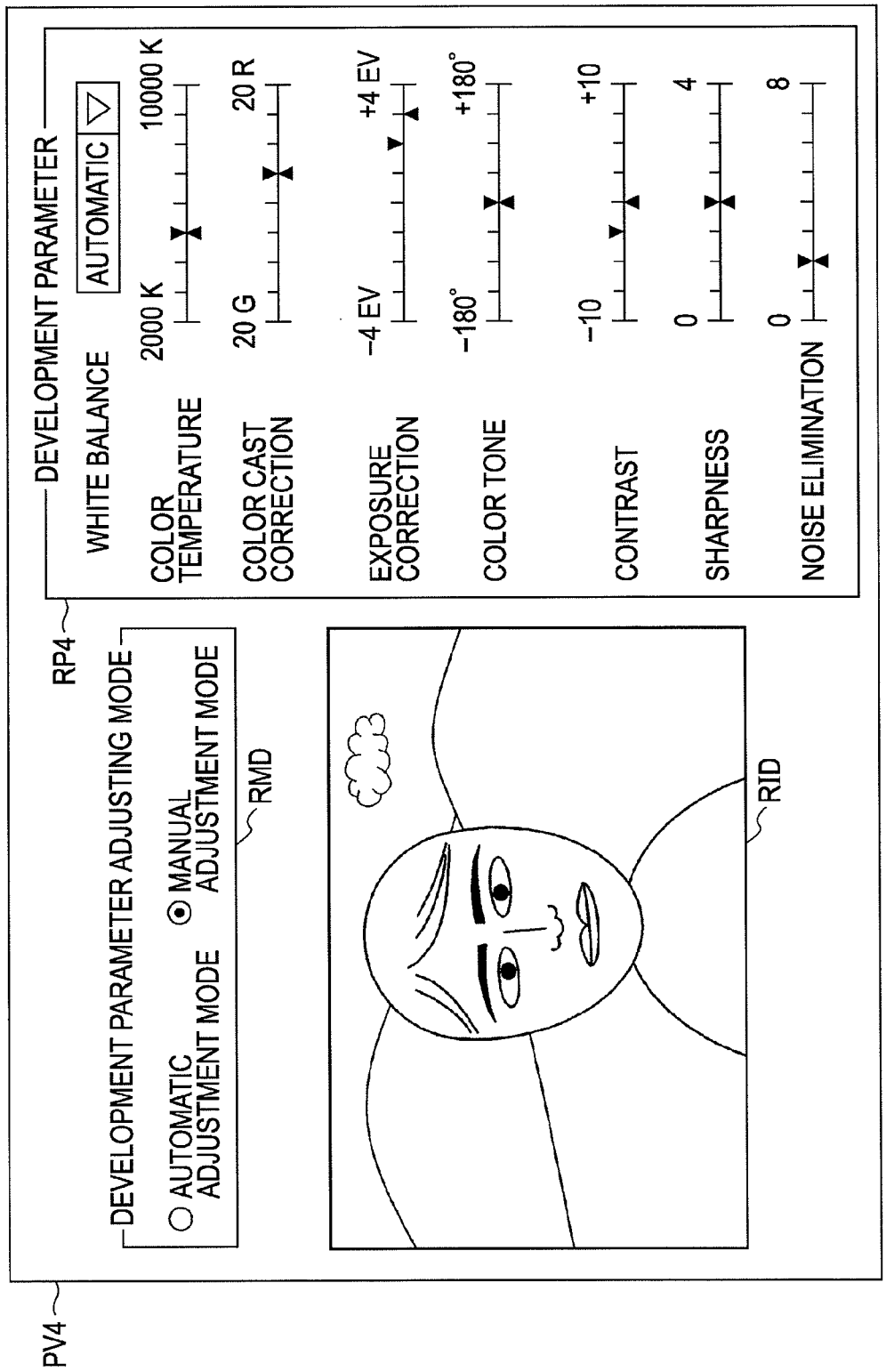
FIG. 17 is an explanatory diagram showing a first modified example of the preview screen.

FIG. 17 is an explanatory diagram showing a first modified example of the preview screen that is displayed in the liquid crystal display device 242 in Step S116. In a preview screen PV4 shown in FIG. 17, the display format of the parameter setting area RP4 is different from that of the preview screen PV2 according to the above-described embodiment. Other aspects are the same as those of the above-described embodiment.

As shown in FIG. 17, in the preview screen PV4 according to the first modified example, on the upper side of each slide bar disposed in a parameter setting area RP4, a marker (reference marker) that represents the development parameter before being changed by a user is added. The added reference marker is set not to be changed by the user, and the user changes the development parameter by moving a marker disposed on the lower side of the slide bar. By adding the reference marker to the slide bar, the user can return the development parameter to the state before change by moving the marker of the slide bar, which is movable, to the position of the reference marker. As described above, it becomes easier to return the development parameter back to the state before change, and accordingly, easiness of adjustment of the development parameter is improved.

Figure 18:
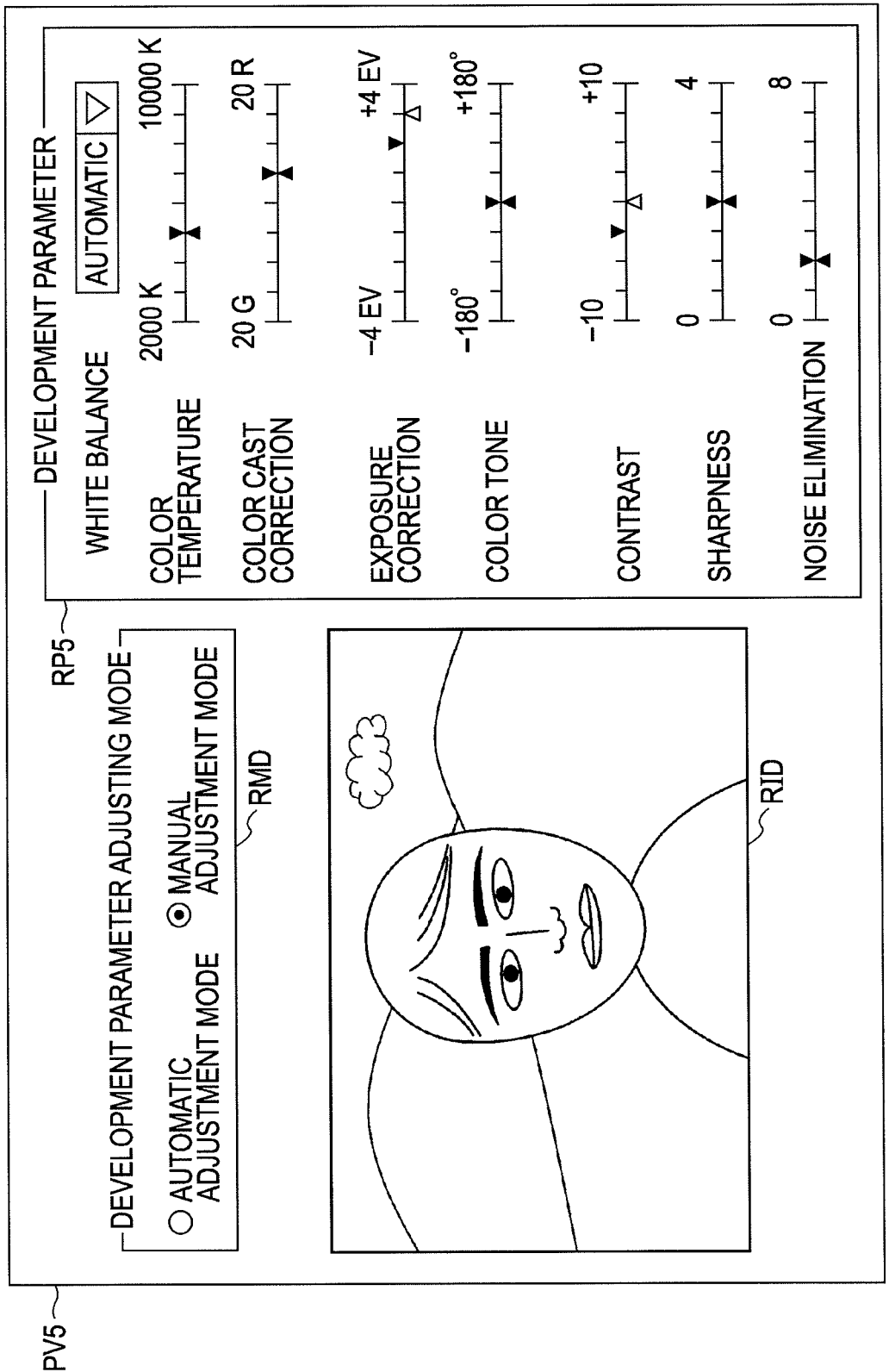
FIG. 18 is an explanatory diagram showing a second modified example of the preview screen.

FIG. 18 is an explanatory diagram showing a preview screen, which is displayed in the liquid crystal display device 242 in Step S116, according to a second modified example. A preview screen PV5 shown in FIG. 18 is different from the preview screen PV4 according to the first modified example that the color of a marker that is moved by a user is changed. Other aspects are the same as those of the first modified example. As described above, by changing the color of the moved marker, the user can perceive the changed development parameter intuitively. Accordingly, the easiness of adjustment of the development parameters is improved. In addition, the color of the maker may be configured to be changed based on a difference of the development parameters before and after change. In such a case, the user can acquire the amount of change of the development parameter based on the color of the marker, and accordingly, easiness of adjustment of the development parameters is improved further.

Figure 19:
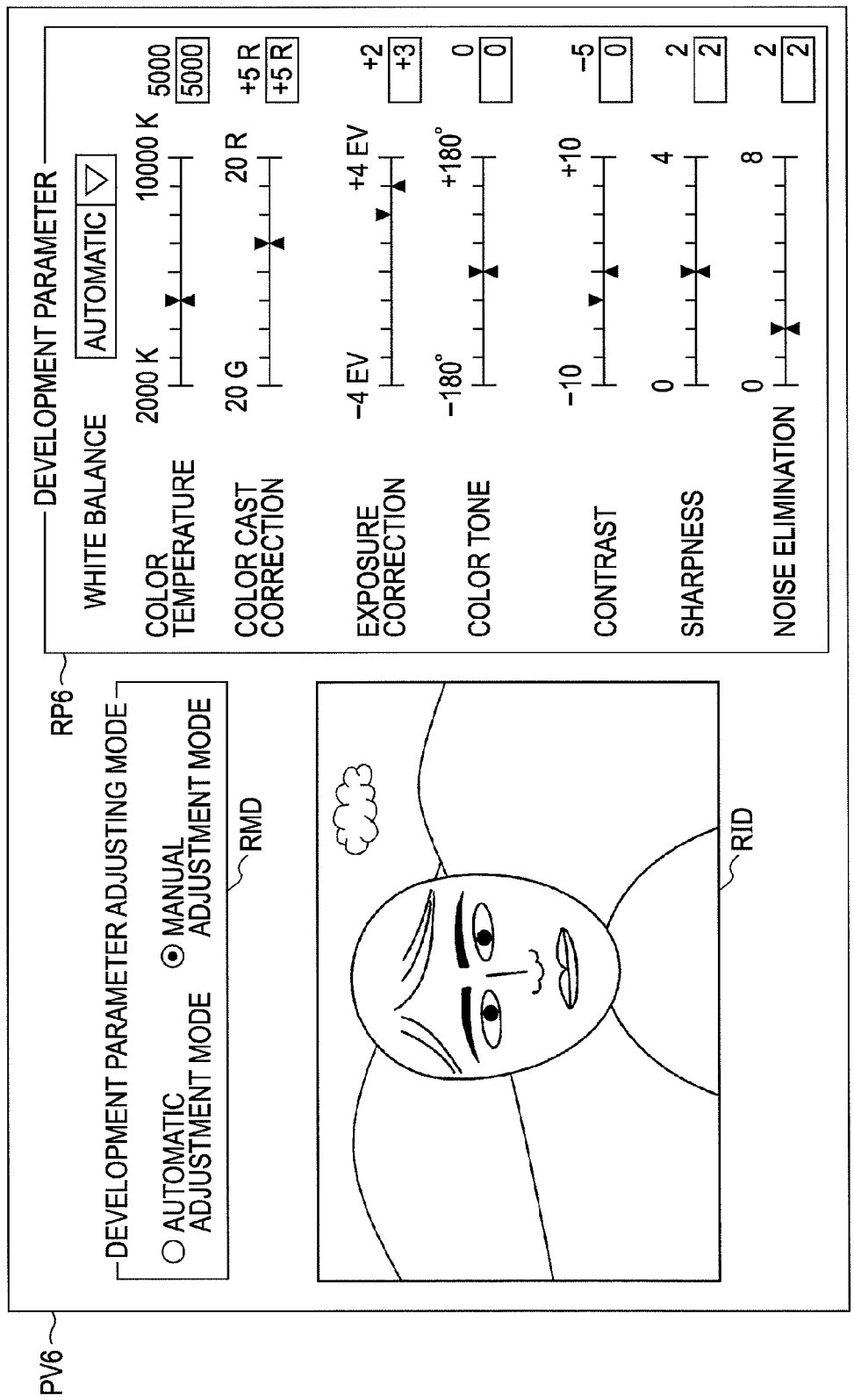
FIG. 19 is an explanatory diagram showing a third modified example of the preview screen.

FIG. 19 is an explanatory diagram showing a preview screen, which is displayed in the liquid crystal display device 242 in Step S116, according to a third modified example. A preview screen PV6 shown in FIG. 19 is different from the preview screen PV4 according to the first modified example that text boxes, which are set not to be rewritable, representing the development parameters before being changed by the user and edit boxes used for inputting the development parameters are disposed. Other aspects are the same as those of the first modified example. As described above, by disposing the text boxes representing the development parameters before change and the edit boxes for inputting the development parameters, a number or the like can be directly input as the development parameter. Accordingly, it becomes easier to change the development parameter to a desired value. In addition, by displaying the development parameters before change in the text boxes, it is possible to return the development parameters to their states before change. As described above, it becomes easier to return the development parameters to their states before change, and accordingly, the easiness of adjustment of the development parameters is improved.

Figure 20:
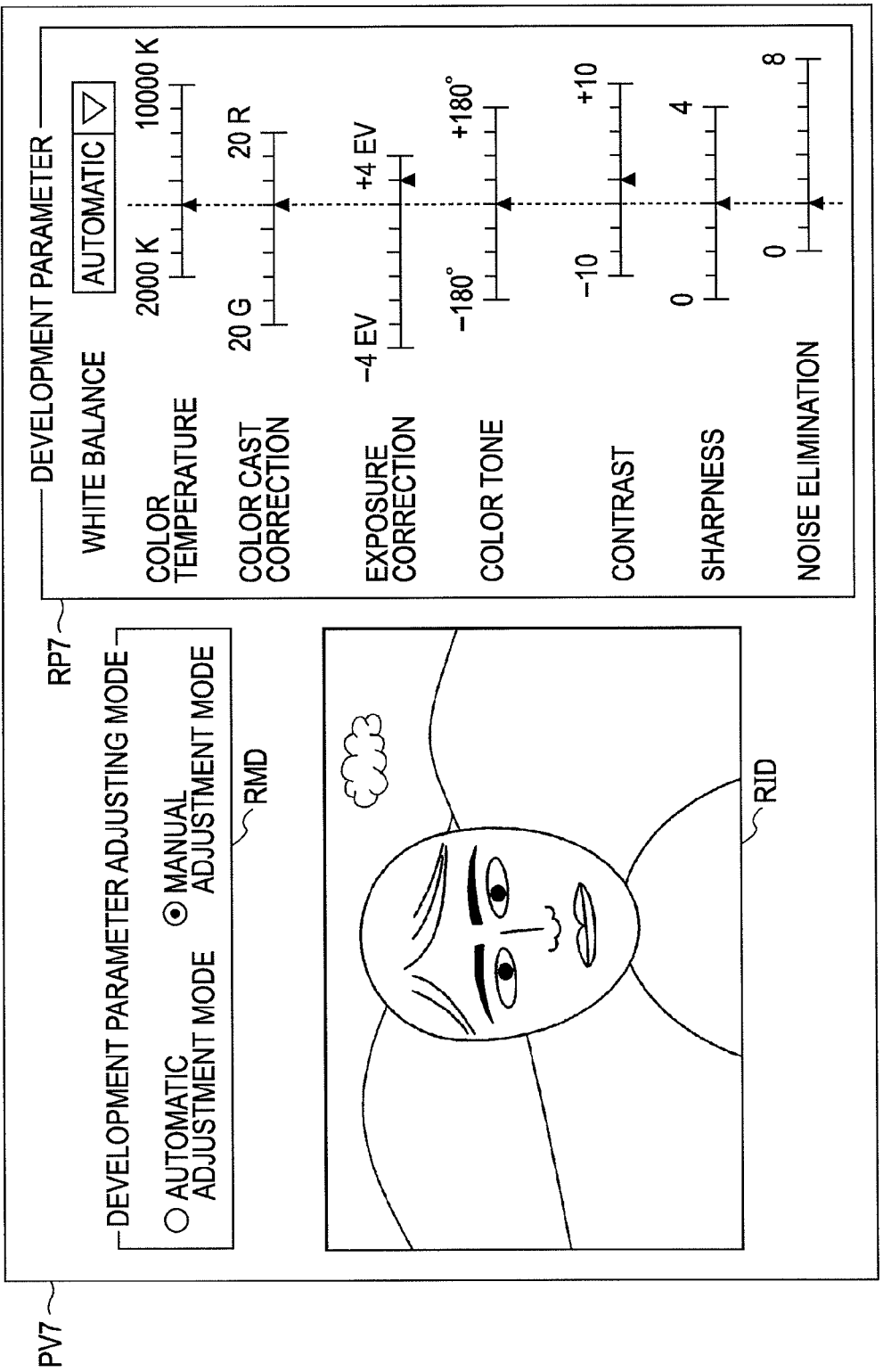
FIG. 20 is an explanatory diagram showing a fourth modified example of the preview screen.

FIG. 20 is an explanatory diagram showing a preview screen, which is displayed in the liquid crystal display device 242 in Step S116, according to a fourth modified example. In the preview screen PV7 shown in FIG. 20, slide bars are disposed such that the development parameters set by image analysis or the like are positioned on a reference line denoted by a dotted line. Accordingly, a user can return the development parameter to the state before change by returning the marker to the reference line. As described above, it becomes easier to return the development parameter to the state before change. Accordingly, the easiness of adjustment of the development parameters is improved.

Figure 21:
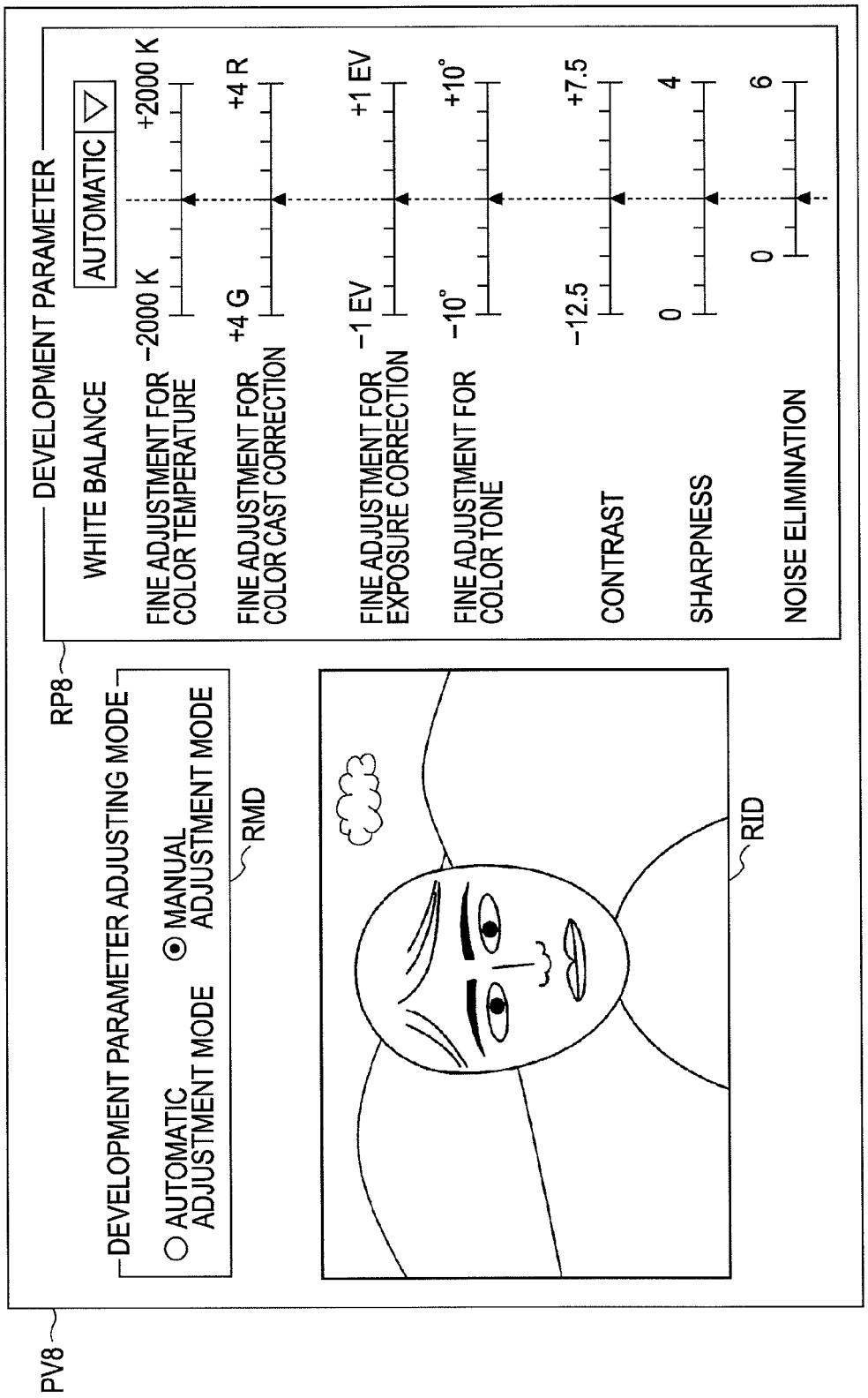
FIG. 21 is an explanatory diagram showing a fifth modified example of the preview screen.

FIG. 21 is an explanatory diagram showing a preview screen, which is displayed in the liquid crystal display device 242 in Step S116, according to a fifth modified example. In a parameter setting area RP8 of the preview screen PV8 shown in FIG. 21, for "color temperature", "color cast correction", "exposure", and "tone", slide bars for changing the absolute values are replaced by slide bars for fine adjustment. Other aspects are the same as those of the fourth modified example shown in FIG. 20. As shown in FIG. 21, also in the fifth modified example, the development parameters set by image analysis or the like are positioned on a reference line denoted by a dotted line. Accordingly, the development parameter can be returned to the state before change more easily. In addition, for the development parameters that have strong influence on the change of an image, instead of changing the absolute values, fine adjustment can be performed. As a result, the user can set appropriate development parameters more easily.

C. MODIFIED EXAMPLES

The invention is not limited to the above-described embodiments or examples and can be performed in various forms within the range not departing from the gist thereof. For example, the invention can be modified as below.

C1. Modified Example 1

In the above-described embodiments, the invention is applied to a development process of a photo viewer. However, the invention may be applied to any arbitrary device that performs a development process. The invention may be applied to any device that has a development processing function such as a personal computer or a printing apparatus that prints an image.

In addition, the invention may be implemented as the following modified examples. Furthermore, the invention may be implemented by combining the following modified examples appropriately.

In addition, the invention may be implemented in various forms. For example, the invention may be implemented in the forms of a development processing device and a development processing method, an image outputting device and an image outputting method by using the above-described development processing device or the above-described development processing method, a computer program for implementing the above-described methods or the functions of the above-described devices, a recording medium on which the above-described computer program is recorded, a data signal that is implemented in a carrier wave including the above-described computer program, and the like.

C2. Modified Example 2

According to Modified Example 2, there is provided a development processing device that develops undeveloped image data generated by a digital camera. The development processing device includes: a development processing unit that generates image data of a predetermined format for which development is completed from the undeveloped image data by performing a development process for the undeveloped image data; a development parameter determining unit that determines a first parameter group relating to a plurality of development parameters used in the above-described development process; and a change screen displaying unit that displays a parameter changing screen. Each first development parameter group can be represented by a one-dimensional numeric value. In addition, the change screen displaying unit displays a reference line disposed in a predetermined direction, a plurality of number lines of a predetermined length of which the position corresponding to the first parameter group is disposed on the reference line, a plurality of marker images that represents positions corresponding to a second parameter group that can be changed by a user on the number line, on the parameter changing screen. The development processing unit performs the development process based on at least the second parameter group.

According to this modified example, the positions of the number lines corresponding to the first parameter group are disposed on the reference line. Accordingly, the user can intuitively perceive existence of a parameter that is deviated from the reference line, and whereby the user can easily recognize that the parameter has been changed by him. In addition, by moving the marker image to a position corresponding to the reference line, the user can return the parameter to the parameter before the change. Accordingly, it becomes easier to return the parameter to the state before the change after the parameter is changed at once, and whereby easiness of adjustment of the development parameters is improved.

C3. Modified Example 3

In the development processing device according to Modified Example 2, the predetermined length of each of the plurality of number lines is in correspondence with a changeable range of the second parameter group. By moving each of the number lines in the direction of the predetermined length, the position corresponding to the first parameter group is disposed on the reference line.

According to this modified example, the lengths of the number lines are in correspondence with the changeable ranges of the second parameter group. Accordingly, the user can set each parameter of the second parameter group to any arbitrary value within the changeable range.

C4. Modified Example 4

In the development processing device according to Modified Example 2, the number line corresponding to a specific parameter among the first parameter group represents the amount of change from the value of the first parameter group, and the position in which the amount of change is zero is disposed on the reference line.

According to this modified example, the number line for the specific parameter corresponds to the amount of change from the value of the first parameter group. Accordingly, the user can intuitively perceive a difference between the first parameter group determined by the development parameter determining unit and the second parameter group.

C5. Modified Example 5

In the development processing device according to Modified Example 4, the range of the amounts of change corresponding to the predetermined length is set to be narrower than the changeable range of the specific parameter. In addition, the number line corresponding to the specific parameter is approximately symmetrical with respect to the reference line as an axis of symmetry.

According to this modified example, the range of the amounts of change is set to be narrower than the changeable range of the specific parameter. Accordingly, fine adjustment of the specific parameter can be performed easily.

C6. Modified Example 6

According to Modified Example 6, there is provided a development processing device that develops undeveloped image data generated by a digital camera. The development processing device includes: a development processing unit that generates image data of a predetermined format for which development is completed from the undeveloped image data by performing a development process for the undeveloped image data; a development parameter determining unit that determines development parameters used in the above-described developing process; and a user interface that accepts a user's direction for changing the development parameters. The above-described user interface prohibits acceptance of the user's direction for changing the development parameters during a period in which the development parameter determining unit performs a process for determining the development parameters.

Generally, when the process for determining the development parameters is completed, development parameters that are previously set are replaced by the development parameters determined in the process. Accordingly, change of the development parameters that is performed by the user during the process for determining the development parameters is not reflected on the development process. However, according to this modified example, acceptance of a user's direction for changing the development parameters is prohibited during a period in which the process for determining the development parameters is performed by the development parameter determining unit. Accordingly, a user's useless operation for changing the development parameters is suppressed, and whereby convenience of adjustment of the development parameters is improved.

C7. Modified Example 7

In the development processing device according to Modified Example 6, a user interface displaying unit that displays the user interface is included further. In addition, the user interface displaying unit sets the display states of at least a change area, which is used for accepting the development parameters from the user, of the user interface to be different for a case where acceptance of the change direction is prohibited and a case where the change direction is not prohibited.

According to this modified example, the display states of the change area that is used for accepting the development parameters are set to be different for a case where acceptance of the change direction is prohibited and a case where acceptance of the change direction is not prohibited. Accordingly, the user can recognize a period in which the development parameters can be changed more accurately, and thereby easiness of adjustment of the development parameters can be improved.

C8. Modified Example 8

In the development processing device according to Modified Example 7, the user interface displaying unit performs gray-out display of the change area for a case where the acceptance of the change direction is prohibited.

According to this modified example, by performing gray-out display of the change area, prohibition of acceptance of the change direction is represented. This gray-out display is generally used as a method for representing prohibition of acceptance of an operation. Accordingly, the user can recognize the period, in which the development parameters can be changed, more easily.

C9. Modified Example 9

In the development processing device according to Modified Example 7, the user interface displaying unit does not display the change area for a case where the acceptance of the change direction is prohibited.

According to this modified example, by not displaying the change area, the prohibition of acceptance of the change direction is represented. By not displaying the change area used for inputting a change direction of which acceptance is prohibited, display of unnecessary information on the user interface is suppressed. Accordingly, usability of the user interface is improved.

C10. Modified Example 10

In the development processing device according to any one of Modified Examples 1 to 9, an undeveloped image data designating unit that accepts designation of the undeveloped image data is included further. In addition, the development parameter determining unit automatically determines the development parameters after the undeveloped image data is designated. The user interface prohibits acceptance of a user's direction for changing the development parameters at least in a period until the development parameters are determined by the parameter determining unit after the undeveloped image data designating unit accepts the designation of the undeveloped image data.

According to this modified example, acceptance of the direction for changing the development parameters is also prohibited from a time when the undeveloped image data is designated to a time when the development parameter determining process is started. Accordingly, the user's operation for changing the development parameters before the development parameter determining process is suppressed, and thereby easiness of adjustment of the development parameters is improved further.

C11. Modified Example 11

According to Modified Example 11, there is provided a development processing device that develops undeveloped image data generated by a digital camera. The development processing device includes: a development processing unit that generates image data of a predetermined format for which development is completed from the undeveloped image data by performing a development process for the undeveloped image data; a development parameter determining unit that determines a first parameter relating to development parameters used in the above-described developing process; and a change screen displaying unit that displays a parameter changing screen. The change screen displaying unit displays the first parameter that is determined by the development parameter determining unit and a second parameter that is changed by the user on the parameter changing screen. In addition, the development processing unit performs the development process based on at least the second parameter.

According to this modified example, the first parameter and the second parameter are displayed on the parameter changing screen. Accordingly, the user can intuitively recognize a parameter item that has been changed by him. In addition, a parameter desired to be changed can be changed by referring to both the first parameter and the second parameter that are displayed on the parameter changing screen. Accordingly, it becomes easier to return the parameter to the state before the change after the parameter is changed at once, and whereby easiness of adjustment of the development parameters is improved.

C12. Modified Example 12

In the development processing device according to Modified Example 11, the first parameter can be represented in a one-dimensional numeric value. In addition, the change screen displaying unit represents the first parameter as a first marker image that is set not to be moved by a user and represents a position on the number line, which is displayed on the parameter changing screen, corresponding to the first parameter and represents the second parameter as a second marker image that is set to be movable by the user and represents a position on the number line.

According to this modified example, by moving the second marker image to a position corresponding to the first marker image, a user can return a changed parameter to the state before the change. Accordingly, it becomes easier to return the development parameter to its state before the change, and thereby easiness of adjustment of the development parameters is improved.

C13. Modified Example 13

In the development processing device according to Modified Example 12, the second marker image is displayed in different colors for a case where the first parameter and the second parameter are the same and a case where the first parameter and the second parameter are different from each other.

According to this modified example, the color of the second marker image is displayed differently based on whether the first parameter and the second parameter are the same. Accordingly, the user can recognize the parameter, which has been changed by him, more easily.

C14. Modified Example 14

In the development processing device according to Modified Example 13, the color of the second marker image is changed in accordance with a difference between the first parameter and the second parameter.

According to this modified example, the color of the second maker image is changed in accordance with a difference between the first parameter and the second parameter. Accordingly, the user can recognize the amount of change of the parameter more easily based on the color of the second marker image.

C15. Modified Example 15

In the development processing device according to Modified Examples 11 to 14, the change screen displaying unit displays the first parameter on the parameter changing screen as a character string that cannot be rewritten by a user and displays the second parameter on the parameter changing screen as a character string that can be rewritten by the user.

According to this modified example, the user can change the second parameter by directly inputting a character. Accordingly, it becomes easier to change the second parameter to a desired value.

What is claimed is:

1. A development processing device that develops undeveloped image data, the development processing device comprising:
   a development processing unit that generates image data of a predetermined format for which development is completed from the undeveloped image data by performing a development process for the undeveloped image data;
   a parameter determining unit that determines at least two initial parameters of a first initial parameter and a second initial parameter that are used for the development process;
   a change screen displaying unit that displays a parameter changing screen on a display screen; and
   an acceptance unit that accepts designation of a first user parameter corresponding to the first initial parameter and a second user parameter corresponding to the second initial parameter from a user,
   wherein the change screen displaying unit displays;
      a first number line corresponding to the first initial parameter and a second number line corresponding to the second initial parameter, wherein each of the number lines has a length corresponding to a settable range of the corresponding parameter;
      a reference line that intersects the first number line in a position corresponding to the first initial parameter and intersects the second number line in a position corresponding to the second initial parameter;
      a first marker that represents a position corresponding to the first user parameter on the first number line, and a second marker that represents a position corresponding to the second user parameter on the second number line on the parameter changing screen,
      wherein the development processing unit performs the development process based on at least the first user parameter and the second user parameter; and
   wherein the change screen displaying unit allows the number line and the reference line to intersect each other in a position of a determined initial parameter by moving the number line corresponding to the determined initial parameter after the parameter determining unit determines the initial parameter.

2. The development processing device according to claim 1,
   wherein a zero position of the first number line intersects the reference line, and
   wherein the first user parameter represents an amount of change from the first initial parameter.

3. The development processing device according to claim 1, wherein the parameter determining unit determines the initial parameter by analyzing the undeveloped image data.

4. A developement processing device that develops undeveloped image data, the development processing device comprising:
   a development processing unit that generates image data of a predetermined format for which development is completed from the undeveloped image data by performing a development process for the undeveloped image data;
   a parameter determining unit that determined at least two initial parameters of a first initial parameter and a second initial parameter that are used for the development process by analyzing the undeveloped image data;
   a change screen displaying unit that displays a parameter changing screen on a display screen; and
   an acceptance unit that accepts designation of a first user parameter corresponding to the first initial parameter and a second user parameter corresponding to the second initial parameter from a user, wherein the acceptance unit does not accept the designation of the user during a period in which the parameter determining unit performs a process for determining the initial parameter,
   wherein the change screen displaying unit displays a first number line corresponding to the first initial parameter, a second number line corresponding to the second initial parameter, a reference line that intersects the first number line in a position corresponding to the first initial parameter and intersects the second number line in a position corresponding to the second initial parameter, a first marker that represents a position corresponding to the first user parameter on the first number line, and a second marker that represents a position corresponding to the second user parameter on the second number line on the parameter changing screen, and
   wherein the development processing unit perform the development process based on at least the first user parameter and the second user parameter.

5. The development processing device according to claim 4, further comprising an undeveloped image data designating unit that accepts designation of the undeveloped image data,
   wherein the parameter determining unit automatically determines the initial parameter after accepting the designation of the undeveloped image data, and
   wherein the acceptance unit does not accept the designation of the user at least until the parameter determining unit determines the initial parameter after the undeveloped image data designating unit accepts the designation of the undeveloped image data.

6. The development processing device according to claim 4, wherein the change screen displaying unit additionally displays a first initial marker that represents a position corresponding to the first initial parameter on the first number line and a second initial marker that represents a position corresponding to the second initial parameter on the second number line.

7. The development processing device according to claim 6, wherein the change screen displaying unit changes a display form of at least one between the corresponding marker and the corresponding initial marker based on relationship between the initial parameter and the user parameter.

8. The development processing device according to claim 4, wherein the change screen displaying unit changes a display form of a corresponding marker based on relationship between the initial parameter and the user parameter.

9. A development processing method for developing undeveloped image data, the method comprising:
   generating image data of a predetermined format for which development is completed from the undeveloped image data by performing a development process for the undeveloped image data;
   determining at least two initial parameters of a first initial parameter and a second initial parameter that are used for the development process;
   displaying a parameter changing screen; and
   accepting designation of a first user parameter corresponding to the first initial parameter and a second user parameter corresponding to the second initial parameter from a user, wherein the parameter changing screen includes:
  a first number line corresponding to the first initial parameter and a second number line corresponding to the second initial parameter, wherein each of the number lines has a length corresponding to a settable range of the corresponding parameter;
  a reference line that intersects the first number line in a position corresponding to the first initial parameter and intersects the second number line in a position corresponding to the second initial parameter;
  a first marker that represents a position corresponding to the first user parameter on the first number line, and a second marker that represents a position corresponding to the second user parameter on the second number line,
wherein the development process is performed based on at least the first user parameter and the second user parameter; and
wherein displaying the paramater changing screen comprises allowing the number line and the reference line to intersect each other in a position of a determined initial parameter by moving the number line corresponding to the determined initial parameter after the parameter determining unit determines the initial parameter.

10. A non-transitory recording medium that stores a computer program for a development process performed for developing image data, wherein the recording medium implements, in a computer, functions including:
  a first function, for generating image data of a predetermined format for which development is completed from the undeveloped image data by performing a development process for the undeveloped image data;
  a second function, for determining at least two initial parameters of a first initial parameter and a second initial parameter that are used for the development process;
  a third function, for displaying a parameter changing screen; and
  a fourth function, for accepting designation of a first user parameter corresponding to the first initial parameter and a second user parameter corresponding to the second initial parameter from a user,
wherein the parameter changing screen includes:
  a first number line corresponding to the first initial parameter and a second number line corresponding to the second initial parameter, wherein each of the number lines has a length corresponding to a settable range of the corresponding parameter;
  a reference line that intersects the first number line in a position corresponding to the first initial parameter and intersects the second number line in a position corresponding to the second initial parameter;
  a first marker that represents a position corresponding to the first user parameter on the first number line, and a second marker that represents a position corresponding to the second user parameter on the second number line,
wherein the development process is performed based on at least the first user parameter and the second user parameter; and
wherein the third function allows the number line and the reference line to intersect each other in a position of a determined initial parameter by moving the number line corresponding to the determined initial parameter after the second function determines the initial parameter.

11. The recording medium according to claim 10, wherein a zero position of the first number line intersects the reference line, and wherein the first user parameter represents an amount of change from the first initial parameter.

12. The recording medium according to claim 10, wherein the second function determines the initial parameter by analyzing the undeveloped image data.

13. A non-transitory recording medium that stores a computer program for a development process performed for developing image data, wherein the recording medium implements, in a computer, functions including:
  a first function, for generating image data of a predetermined format for which development is completed from the undeveloped image data by performing a development process for the undeveloped image data;
  a second function, for determining at least two initial parameters of a first initial parameter and a second initial parameter that are used for the development process by analyzing the undeveloped image data;
  a third function, for displaying a parameter changing screen; and
  a fourth function, for accepting designation of a first user parameter corresponding to the first initial parameter and a second user parameter corresponding to the second initial parameter from a user, wherein the fourth function does not accept the designation of the user during a period in which the second function performs a process for determining the initial parameter;
wherein the parameter changing screen includes a first number line corresponding to the first initial parameter, a second number line corresponding to the second initial parameter, a reference line that intersects the first number line in a position corresponding to the first initial parameter and intersects the second number line in a position corresponding to the second initial parameter a first marker that represents a position corresponding to the first user parameter on the first number line and a second marker that represents a position correspondin to the second user parameter on the second number line, and
wherein the development process is performed based on at least the first user parameter and the second user parameter.

14. The recording medium according to claim 13, further comprising a fifth function, for accepting designation of the undeveloped image data,
  wherein the second function automatically determines the initial parameter after accepting the designation of the undeveloped image data, and
  wherein the fourth function does not accept the designation of the user at least until the second function determines the initial parameter after the fifth function accepts the designation of the undeveloped image data.

15. The recording medium according to claim 13, wherein the third function additionally displays a first initial marker that represents a position corresponding to the first initial parameter on the first number line and a second initial marker that represents a position corresponding to the second initial parameter on the second number line.

16. The recording medium according to claim 15, wherein the third function changes a display form of at least one between the corresponding marker and the corresponding initial marker based on relationship between the initial parameter and the user parameter.

17. The recording medium according to claim 13, wherein the third function changes a display form of a corresponding marker based on relationship between the initial parameter and the user parameter.

* * * * *

UNITED STATES PATENT AND TRADEMARK OFFICE
CERTIFICATE OF CORRECTION

| | | |
|---|---|---|
| PATENT NO. | : 8,355,070 B2 | Page 1 of 1 |
| APPLICATION NO. | : 12/471329 | |
| DATED | : January 15, 2013 | |
| INVENTOR(S) | : Ryuichi Shiohara | |

It is certified that error appears in the above-identified patent and that said Letters Patent is hereby corrected as shown below:

On the Title Page, Item (54) and in the Specification, column 1, lines 1-5, for the title on Letters Patent, please replace "DEVELOPMENT PROCESSING DEVICE, DEVELOPMENT PROCESSING METHOD, AND STORAGE MEDIUM OF COMPUTER PROGRAM FOR DEVELOPMENT PROCESS FOR DEVELOPING UNDEVELOPED IMAGE DATA" with –

DEVELOPMENT PROCESSING DEVICE, DEVELOPMENT PROCESSING METHOD, AND STORAGE MEDIUM OF COMPUTER PROGRAM FOR DEVELOPMENT PROCESS FOR DEVELOPING UNDEVELOPED IMAGE DATA UTILIZING USER PARAMETERS AND NUMBER LINES

Signed and Sealed this
Twenty-seventh Day of May, 2014

Michelle K. Lee
*Deputy Director of the United States Patent and Trademark Office*